United States Patent
Lee

(10) Patent No.: US 9,459,708 B2
(45) Date of Patent: Oct. 4, 2016

(54) MOBILE TERMINAL AND CONTROLLING METHOD THEREOF

(71) Applicant: LG ELECTRONICS INC., Seoul (KR)

(72) Inventor: Seyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/459,625

(22) Filed: Aug. 14, 2014

(65) Prior Publication Data

US 2015/0153843 A1  Jun. 4, 2015

(30) Foreign Application Priority Data

Dec. 3, 2013  (KR) .................. 10-2013-0149126

(51) Int. Cl.
| | |
|---|---|
| *G06F 3/0346* | (2013.01) |
| *H04M 1/725* | (2006.01) |
| *G06F 3/0487* | (2013.01) |
| *G06F 1/16* | (2006.01) |
| *G06F 3/01* | (2006.01) |

(52) U.S. Cl.
CPC ........... *G06F 3/0346* (2013.01); *G06F 1/1694* (2013.01); *G06F 3/017* (2013.01); *G06F 3/0487* (2013.01); *H04M 1/72519* (2013.01); *G06F 2200/1637* (2013.01); *G06F 2203/04803* (2013.01); *H04M 1/72522* (2013.01); *H04M 2250/12* (2013.01)

(58) Field of Classification Search
CPC ..................... G06F 1/1694; G06F 2200/1637; G06F 2203/04803; G06F 3/017; G06F 3/0346; G06F 3/0487; H04M 1/72519; H04M 1/72522; H04M 2250/12

USPC .......................................... 345/156
See application file for complete search history.

(56) References Cited

U.S. PATENT DOCUMENTS

| | | | |
|---|---|---|---|
| 8,717,283 B1 * | 5/2014 | Lundy | G06F 3/017 345/156 |
| 2005/0212752 A1 * | 9/2005 | Marvit | G06F 3/0346 345/156 |
| 2006/0197753 A1 | 9/2006 | Hotelling | |

(Continued)

FOREIGN PATENT DOCUMENTS

| | | |
|---|---|---|
| EP | 2 592 548 A2 | 5/2013 |
| EP | 2 631 759 A2 | 8/2013 |

OTHER PUBLICATIONS

European Search Report issued in Application No. 14182370.8 dated May 26, 2015.

*Primary Examiner* — Viet Pham
(74) *Attorney, Agent, or Firm* — KED & Associates, LLP

(57) ABSTRACT

A mobile terminal and controlling method thereof are disclosed, by which a currently displayed function screen can be switched to a desired function screen using a motion gesture of a mobile terminal while at least two functions are enabled. The present disclosure includes a display unit configured to display a screen of a first function among screens of a plurality of currently executed functions, a motion sensor configured to detect a motion gesture of the mobile terminal, and a controller configured to switch the screen of the first function to a screen of a second function among the screens of the plurality of currently executed functions, the second function is associated with the detected motion gesture.

16 Claims, 22 Drawing Sheets

(56) References Cited

U.S. PATENT DOCUMENTS

| | | |
|---|---|---|
| 2007/0004451 A1 | 1/2007 | Anderson |
| 2009/0197635 A1 | 8/2009 | Kim et al. |
| 2009/0303204 A1* | 12/2009 | Nasiri .................... A63F 13/06 345/184 |
| 2011/0053641 A1* | 3/2011 | Lee ....................... G06F 1/1626 455/556.1 |
| 2011/0124376 A1* | 5/2011 | Kim ...................... G06F 1/1626 455/566 |
| 2013/0271360 A1 | 10/2013 | MacDougall et al. |

* cited by examiner

FIG. 12
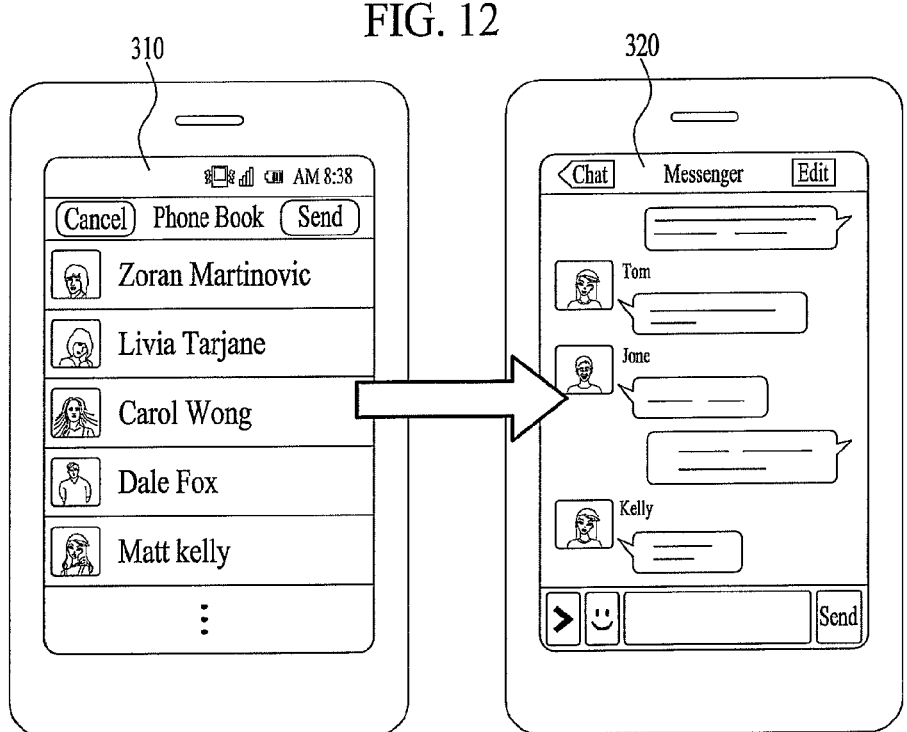
(a)
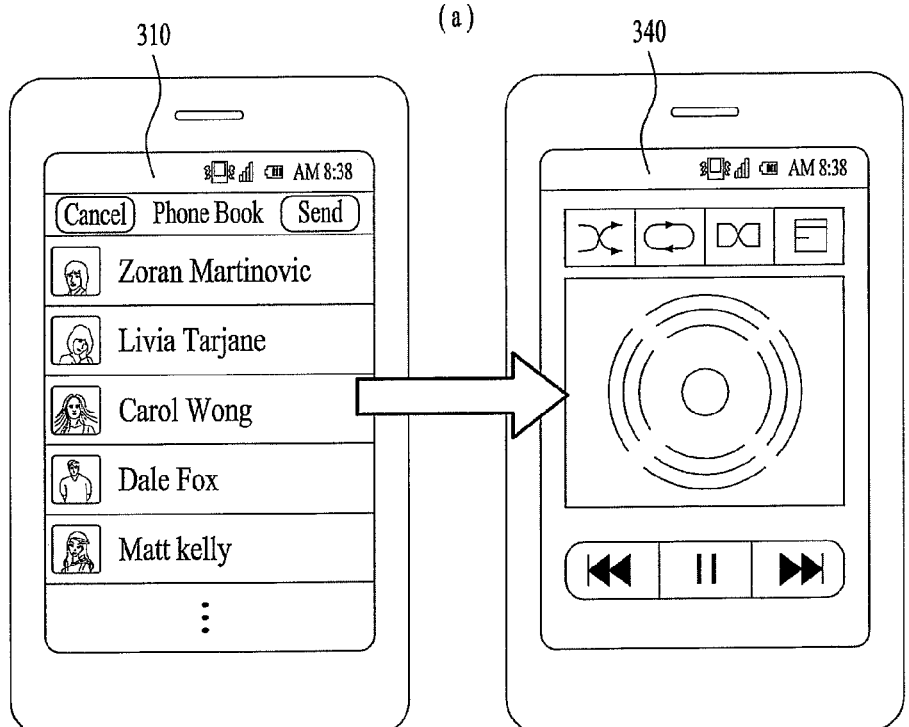
(b)

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2013-0149126, filed on Dec. 3, 2013, the contents of which are hereby incorporated by reference herein in their entirety.

BACKGROUND

1. Field

The present disclosure relates to a mobile terminal, and more particularly, to a mobile terminal and a method of controlling the mobile terminal.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a smart device of a mobile terminal type such as a smartphone, a smart tablet and the like provides applications, widgets and the like to provide various functions. And, a user is then able to use a desired application or widget to use.

The smart device supports multitasking capable of activating to use at least two applications. And, a user is able to activate and use several applications together.

However, a method of switching a screen of an application according to a related art causes the following problems. First of all, in order to activate a $2^{nd}$ application in the course of using a screen of an activated $1^{st}$ application, the screen of the $1^{st}$ application is switched to a home screen to which the $2^{nd}$ application belongs and an icon of the $2^{nd}$ application is then selected from the home screen.

Secondly, while a $1^{st}$ application and a $2^{nd}$ applications are active, in order to switch a screen of the $1^{st}$ application to a screen of the $2^{nd}$ application in the course of using the screen of the $1^{st}$ application, the screen of the $1^{st}$ application is switched to a home screen to which the $2^{nd}$ application belongs in the first place. An icon of the $2^{nd}$ application within the home screen is selected or the $2^{nd}$ application is selected by pressing a home key for paging a list of recently used applications.

SUMMARY OF THE INVENTION

Accordingly, embodiments of the present disclosure are directed to a mobile terminal and controlling method thereof that substantially obviate one or more problems due to limitations and disadvantages of the related art.

One object of the present disclosure is to provide a mobile terminal and controlling method thereof, by which a currently displayed function screen can be switched to a desired function screen using a motion gesture of a mobile terminal while at least two functions are enabled.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a mobile terminal according to the present disclosure may include a display unit configured to display a screen of a first function among screens of a plurality of currently executed functions, a motion sensor configured to detect a motion gesture of the mobile terminal, and a controller configured to switch the screen of the first function to a screen of a second function among the screens of the plurality of currently executed functions, the second function is associated with the detected motion gesture.

In another aspect of the present disclosure, as embodied and broadly described herein, a method of controlling a mobile terminal according to the present disclosure may include the steps of executing a plurality of functions, displaying a screen of a first function among screens of a plurality of executed functions, detecting a motion gesture of the mobile terminal, switching the screen of the first function to a screen of a second function among the screens of the plurality of executed functions, the second function is associated with the detected motion gesture, and displaying the screen of the second function.

Effects obtainable from the present disclosure are non-limited by the above mentioned effect. And, other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIGS. 5 to 22 are diagrams of display screen configurations to describe a method of controlling a mobile terminal according to the present disclosure.

DETAILED DESCRIPTION

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present disclosure can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
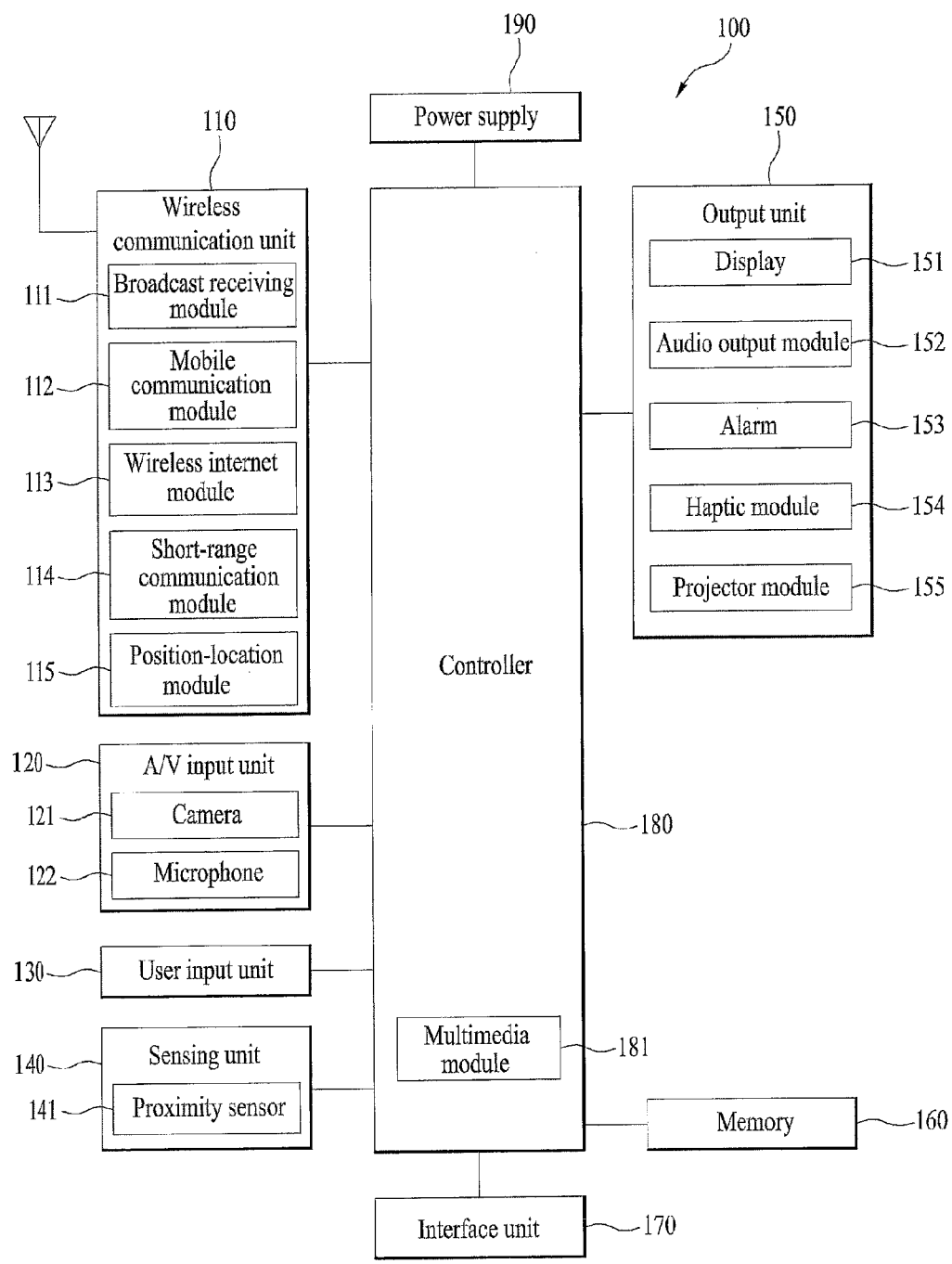
FIG. 1 is a block diagram of a mobile terminal according to one embodiment of the present disclosure.

FIG. 1 is a block diagram of a mobile terminal 100 in accordance with an embodiment of the present disclosure. FIG. 1 shows the mobile terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
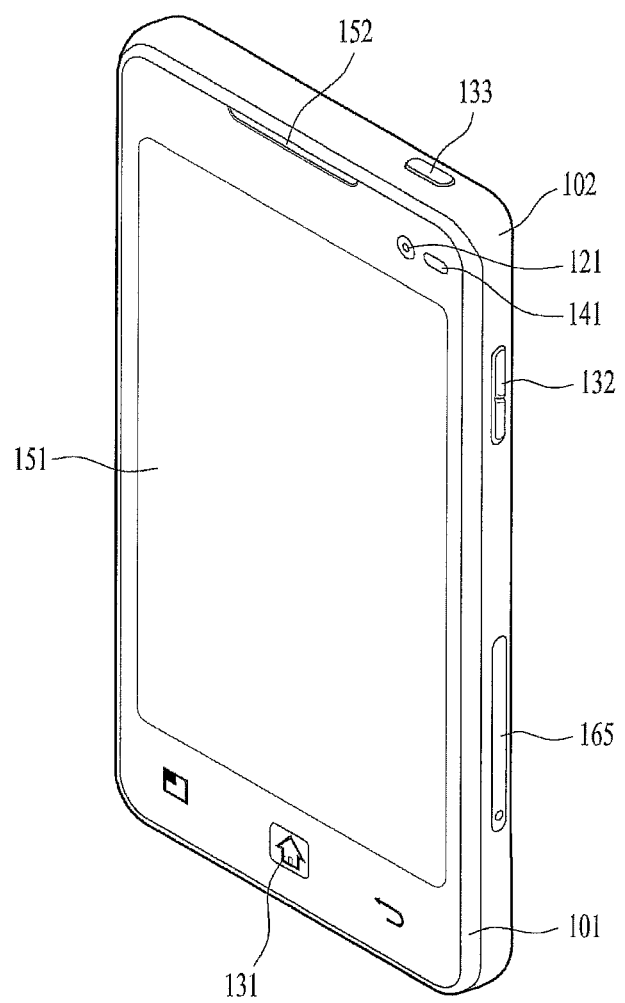
FIG. 2 is a front perspective diagram of a mobile terminal according to one embodiment of the present disclosure.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present disclosure.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
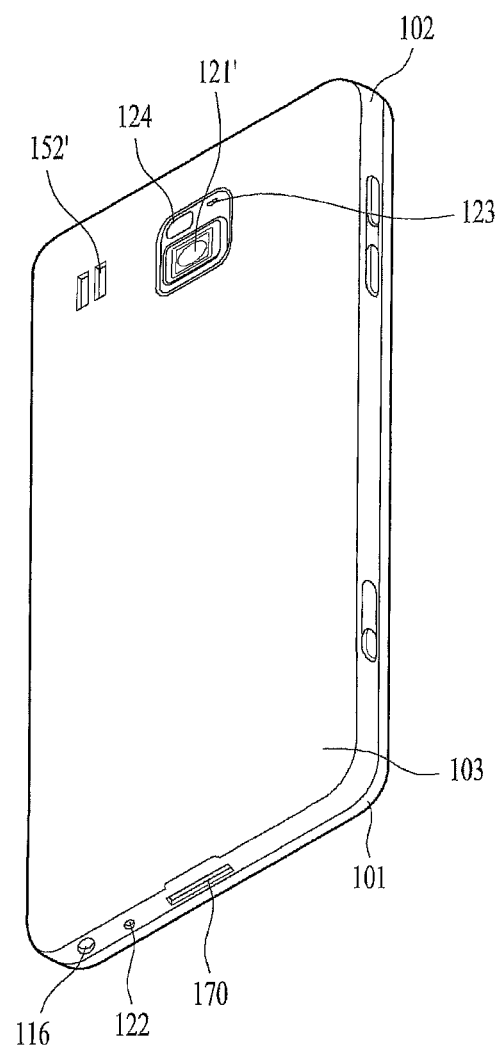
FIG. 3 is a rear perspective diagram of a mobile terminal according to one embodiment of the present disclosure.

FIG. 3 is a perspective diagram of a backside of the terminal shown in FIG. 3.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Meanwhile, according to an embodiment of the present disclosure, a user's touch action means a touch gesture implemented in a manner of performing a contact touch or a proximity touch on the display unit 151 of the touchscreen type. And, a touch input means an input received in response to the touch gesture.

The touch gesture may be categorized into one of a tapping, a touch & drag, a flicking, a press, a multi-touch, a pinch-in, a pinch out and the like in accordance with an action.

In particular, the tapping includes an action of lightly pressing and depressing the display unit 151 once and means a touch gesture such as a lock of a mouse of a normal personal computer.

The touch & drag is an action of touching the display unit, then moving the touch to a specific point by maintaining the touch to the display unit 151, and then releasing the touch from the display unit 151. When an object is dragged, the corresponding object can be displayed in a manner of moving continuously in a drag direction.

The flicking means an action of touching the display unit 151 and then performing a stroke in a specific direction (e.g., top direction, bottom direction, right direction, left direction, diagonal direction, etc.) at a specific speed (or strength). If a touch input of flicking is received, the mobile terminal 100 processes a specific operation based on a flicking direction, a flicking speed and the like.

The press means an action of touching the display unit 151 and then continuing the touch for preset duration at least.

The multi-touch means an action of simultaneously touching a plurality of points on the display unit 151.

The pinch-in means an action of dragging a plurality of pointers currently multi-touching the display unit 151 in an approaching direction. In particular, the pinch-in means a drag performed in a manner of starting with at least one of a plurality of points multi-touched on the display unit 151 and then progressing in a direction having a plurality of the multi-touched points get closer to each other.

The pinch-out means an action of dragging a plurality of pointers currently multi-touching the display unit 151 in a moving-away direction. In particular, the pinch-out means a drag performed in a manner of starting with at least one of a plurality of points multi-touched on the display unit 151 and then progressing in a direction having a plurality of the multi-touched points move away from each other.

In the following description, while at least two functions are enabled, a process for switching a currently displayed function screen to a desired function screen using a motion gesture of a mobile terminal is explained in detail with reference to FIGS. 4 to 22.

Figure 4:
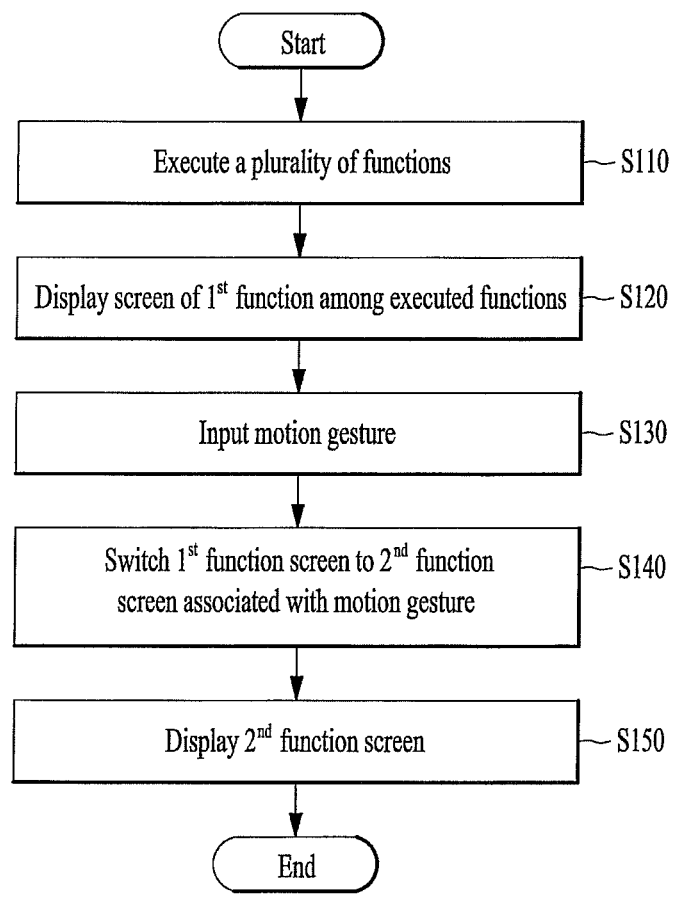
FIG. 4 is a flowchart for a method of controlling a mobile terminal according to the present disclosure.

FIG. 4 is a flowchart for a method of controlling a mobile terminal according to the present disclosure.

FIGS. 5 to 22 are diagrams of display screen configurations to describe a method of controlling a mobile terminal according to the present disclosure.

Referring to FIGS. 4 to 22, while a plurality of functions are executed or enabled (i.e., in multitasking state) [S110], the controller 180 of the mobile terminal 100 displays an operating screen of a 1st function set by a user among the plurality of executed functions on the touchscreen 151 [S120].

The above-mentioned functions include all functions that can be provided by the mobile terminal 100. For instance, the above-mentioned functions can include applications, widgets, a home screen, a standby screen, menu items provided to the mobile terminal 100 and the like for providing various kinds of functions.

In doing so, each of the enabled functions may be individually selected and enabled by a user. And, 1st and 2nd functions among the enabled functions may be mapped to each other in advance by a user.

In this case, if the 1st function is enabled, the 2nd function mapped to the 1st function can be simultaneously enabled together with the 1st function. For instance, the 1st function may provide a function (e.g., a chatting function, a stock-dealing function, a blog function, an SNS function, a video function, etc.) related to a private life of the user, while the 2nd function may provide a function (e.g., a home screen, a document viewer, etc.) having nothing to do with the user's private life.

In particular, if the user enables the 1st function related to user's private life, the controller 180 simultaneously enables the 2nd function mapped to the 1st function as well. While an operating screen of the 1st function is displayed on the mobile terminal 100, if the user does not want to the operating screen of the 1st function to be exposed to others (e.g., a boss in user's company, etc.) located nearby the mobile terminal 100, the user can directly switch the operating screen of the 1st function to an operating screen of the 2nd function by inputting a prescribed motion of the mobile terminal 100 to switch the operating screen of the 1st function to the operating screen of the 2nd function by the method according to the present disclosure. The prescribed motion may form a gesture input in which the mobile terminal 100 is moved according to preset movements to form an input. The prescribed motion forming a gesture input is referred to hereinafter as a motion gesture.

Referring now to FIG. 4, if the controller 180 detects the user's input of the motion gesture of the mobile terminal 100 through the motion sensor 142 [S130], the controller determines a motion property of the inputted motion gesture, searches the multitasking functions for the 2nd function associated with the determined motion property, switches the operating screen of the 1st function to the operating screen of the found 2nd function [S140], and then displays the operating screen of the 2nd function [S150].

In doing so, motion gestures for displaying the operating screens of the functions may be set in the memory 160. In particular, functions and motion properties of motion gestures for switching operating screens of the functions may be saved in the memory 160 in a manner of being mapped to each other, respectively.

In more particular, if the user inputs the motion gesture of the mobile terminal 100, the controller 180 searches the memory 160 for a function mapped to a motion property corresponding to the inputted motion gesture and then switches a function screen currently displayed on the screen to a screen of the found function to display.

In doing so, if the function found from the memory 160 is a currently disabled function, the controller 180 may maintain the function screen currently displayed on the screen as it is.

Figure 5:
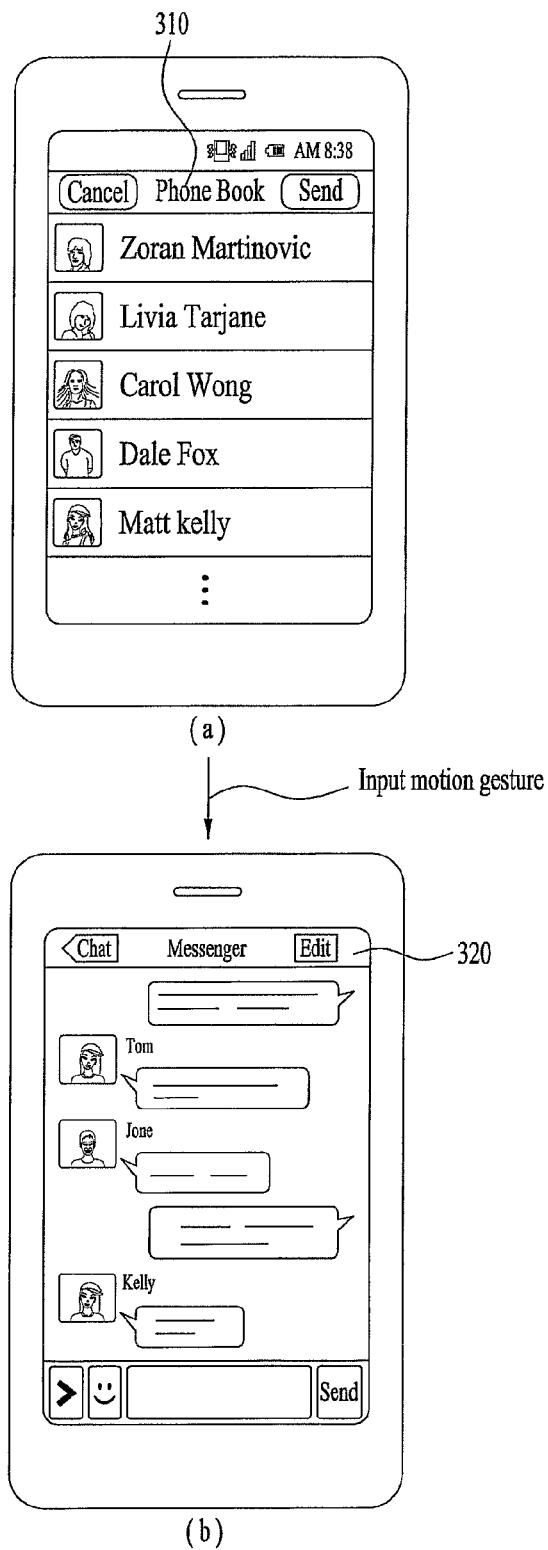

Referring to FIG. 5, while the controller 180 displays a 1st function screen 310 of a 1st function among currently enabled functions, the controller 180 displays a 2nd function screen 320 by switching the 1st function screen 310 to the 2nd function screen 320 in response to a motion gesture inputted by a user.

For instance, in the example shown in FIG. 5, among the currently enabled functions, the 1st function is a phonebook and the 2nd function is a chatting messenger. And, FIG. 5(a) shows that the operating screen 310 of the phonebook is displayed.

While the operating screen 310 of the phonebook is displayed, if an input of a 1st motion gesture is detected through the motion sensor 142, referring to FIG. 5(b), the controller 180 can display the operating screen 320 of the chatting messenger by switching the operating screen 310 of the phonebook to the operating screen 320 of the chatting messenger.

In particular, if a function mapped to a motion property corresponding to the 1st motion gesture is the chatting messenger function in the memory 160, the controller 180 switches the operating screen 310 of the phonebook to the operating screen 320 of the chatting messenger.

While the operating screen 320 of the chatting messenger is displayed, if an input of a 2nd motion gesture is detected through the motion sensor 142, the controller 180 can display the operating screen 310 of the phonebook again by switching the operating screen 320 of the chatting messenger to the operating screen 310 of the phonebook.

In particular, if a function mapped to a motion property corresponding to the 2nd motion gesture is the phonebook messenger function in the memory 160, the controller 180 switches the operating screen 320 of the chatting messenger to the operating screen 310 of the phonebook.

In this case, the 1st motion gesture and the 2nd motion gesture may have the same motion property or motion property values contrary to each other.

For instance, if the motion property of the 1st motion gesture shows that the mobile terminal 100 is moved (or stroked, slid, shifted, rotated, etc.) in a 1st direction, the motion property of the 2nd motion gesture may show that the mobile terminal 100 is moved in a 2nd direction opposite to the 1st direction.

For another instance, if the motion property of the 1st motion gesture shows that the mobile terminal 100 is rotated in a 1st direction with reference to X-axis in 3 dimensions, the motion property of the 2nd motion gesture may show that the mobile terminal 100 is rotated in a 2nd direction opposite to the 1st direction.

For another instance, if the motion property of the 1st motion gesture shows that the mobile terminal 100 is rotated in a 1st direction with reference to Y-axis in 3 dimensions, the motion property of the 2nd motion gesture may show that the mobile terminal 100 is rotated in a 2nd direction opposite to the 1st direction.

For another instance, if the motion property of the 1st motion gesture shows that the mobile terminal 100 is rotated in a 1st direction with reference to Z-axis in 3 dimensions, the motion property of the 2nd motion gesture may show that the mobile terminal 100 is rotated in a 2nd direction opposite to the 1st direction.

Moreover, the 1st motion gesture and the 2nd motion gesture may have different motion properties.

For instance, if the motion property of the 1st motion gesture is the property when the mobile terminal 100 is moved at a 1st moving speed in a 1st direction, the motion property of the 2nd motion gesture may be the property when the mobile terminal 100 is moved at a 2nd moving speed (1st moving speed>2nd moving speed, or 1st moving speed<2nd moving speed) different from the 1st moving speed in the 1st direction.

For another instance, if the motion property of the 1st motion gesture is the property of a 1st motion amount when the mobile terminal 100 is moved in a 1st direction, the motion property of the 2nd motion gesture may be the property of a 2nd motion amount different from the 1st motion amount (1st motion amount>2nd motion amount, or 1st motion amount<2nd motion amount) when the mobile terminal 100 is moved in the 1st direction.

For example, referring to FIG. 6(a), when a 1st function and a 2nd function among currently enabled functions are a phonebook and a chatting messenger, respectively, while an operating screen 310 of the phonebook is displayed, if an input of a motion gesture of moving the mobile terminal 100 in a left direction is detected, the controller 180 searches the memory 160 for a function mapped to a motion property corresponding to the motion gesture moved in the left direction. If the function found from the memory 160 is the phonebook and the operating screen 310 of the phonebook is currently displayed on the touchscreen 151, the controller 180 maintains the current operating screen 310 of the phonebook as it is, or may display a home screen 330 by switching the operating screen 310 of the phonebook to the home screen 330.

Referring to FIG. 6(b), after the operating screen 330 of the home screen has been switched to the operating screen 310 of the phonebook, if an input of a motion gesture of moving the mobile terminal 100 in a right direction is detected, the controller 180 searches the memory 160 for a function mapped to a motion property corresponding to the motion gesture moved in the right direction. If the function found from the memory 160 is the chatting messenger function, the controller 180 displays an operating screen 320 of the chatting messenger by switching the operating screen 310 of the phonebook to the operating screen 320 of the chatting messenger.

Referring to FIG. 6(c), after the operating screen 310 of the phonebook has been switched to the operating screen 320 of the chatting messenger, if an input of a motion gesture of moving the mobile terminal 100 in the right direction is detected, the controller 180 searches the memory 160 for a function mapped to a motion property corresponding to the motion gesture moved in the right direction.

If the function found from the memory 160 is the chatting messenger and the operating screen 320 of the chatting messenger is currently displayed on the touchscreen 151, the controller 180 maintains the operating screen 320 of the chatting messenger as it is, or may display the home screen 330 by switching the operating screen 320 of the chatting messenger to the home screen 330.

Referring to FIG. 6(d), after the operating screen 320 of the phonebook has been switched to the operating screen 320 of the chatting messenger, if an input of a motion gesture of moving the mobile terminal 100 in the left direction is detected, the controller 180 searches the memory 160 for a function mapped to a motion property corresponding to the motion gesture moved in the left direction. If the function found from the memory 160 is the phonebook function, the controller 180 displays the operating screen 310 of the phonebook by switching the operating screen 320 of the chatting messenger to the operating screen 310 of the phonebook.

Figure 6:
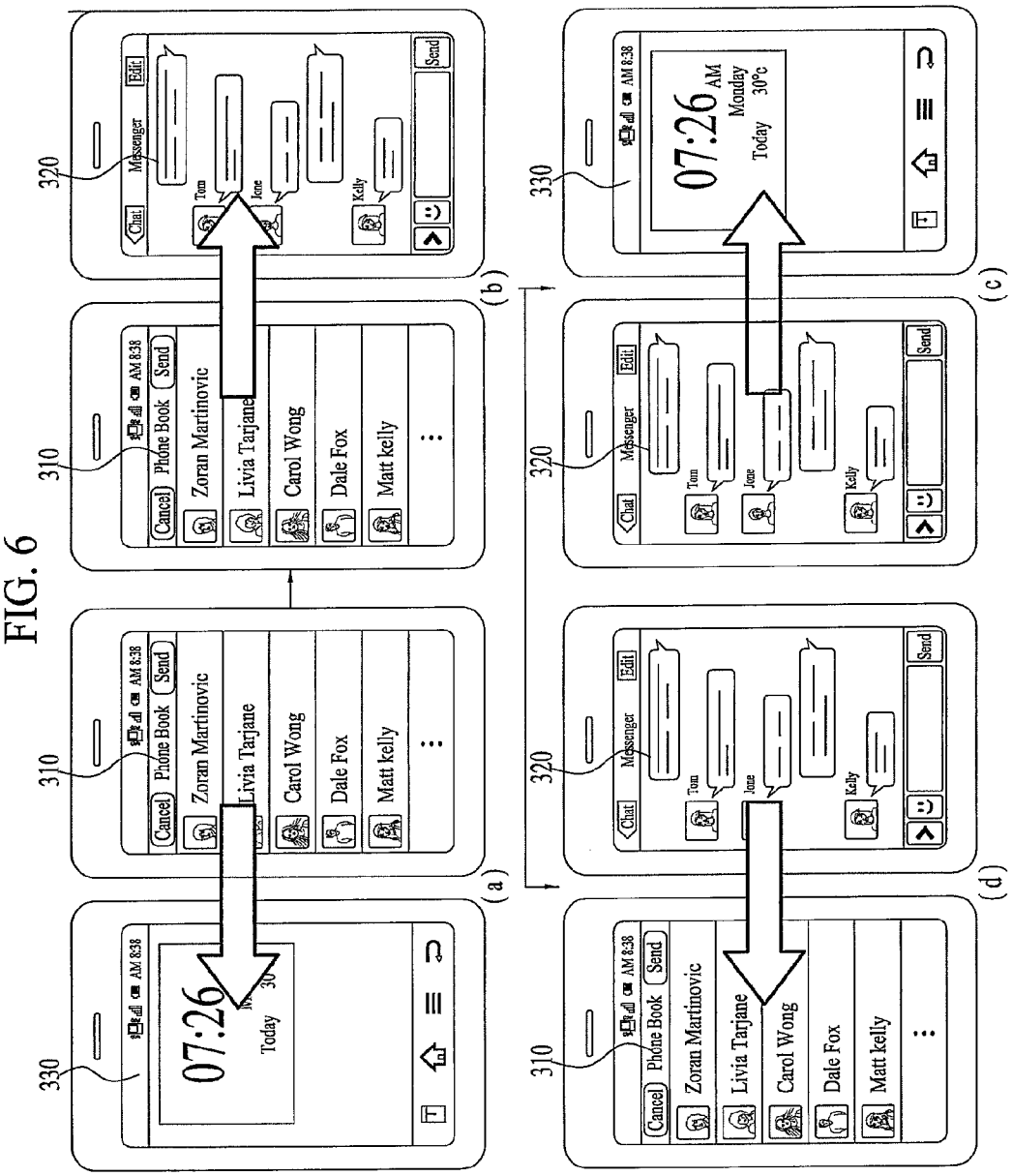
Figure 7:
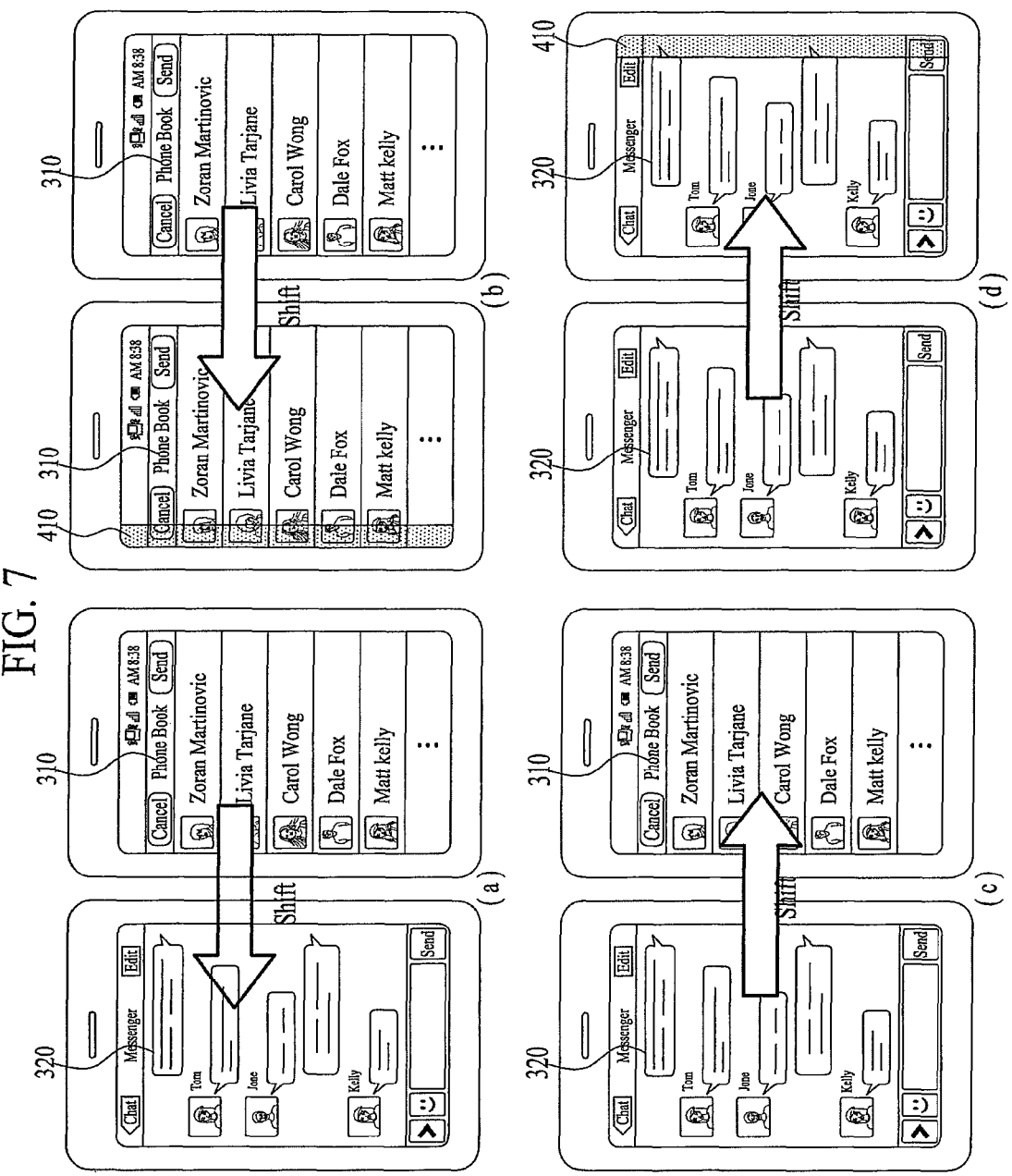

Referring to FIG. 7(*a*), while the operating screen 310 of the phonebook shown in FIG. 6(*a*) is displayed, if an input of a motion gesture of moving the mobile terminal 100 in the left direction is detected and a function mapped to a motion property corresponding to the motion gesture moved in the left direction is found as the phonebook function identical to the operating screen 310 of the phonebook currently displayed on the touchscreen 151 from the memory 160, the controller 180 maintains the current operating screen 310 of the phonebook as it is. Alternatively, the controller 180 may switch the current operating screen 310 of the phonebook to the operating screen 320 of the chatting messenger or to a most recently accessed screen. Alternatively, referring to FIG. 7(*b*), the controller 180 can display a visual effect 410, which indicates that there is no more operating screen of a function to move to because the found phonebook function is identical to the operating screen 310 of the phonebook currently displayed on the touchscreen 151, on the operating screen 310 of the phonebook.

Referring to FIG. 7(*c*), while the operating screen 320 of the chatting messenger shown in FIG. 6(*a*) is displayed, if an input of a motion gesture of moving the mobile terminal 100 in the right direction is detected and a function mapped to a motion property corresponding to the motion gesture moved in the right direction is found as the chatting messenger function identical to the operating screen 320 of the chatting messenger currently displayed on the touchscreen 151 from the memory 160, the controller 180 maintains the current operating screen 320 of the chatting messenger as it is. Alternatively, the controller 180 may switch the current operating screen 320 of the chatting messenger to the operating screen 310 of the phonebook or to a most recently accessed screen. Alternatively, referring to FIG. 7(*d*), the controller 180 can display a visual effect 410, which indicates that there is no more operating screen of a function to move to because the found chatting messenger function is identical to the operating screen 320 of the chatting messenger currently displayed on the touchscreen 151, on the operating screen 320 of the chatting messenger.

Figure 8:
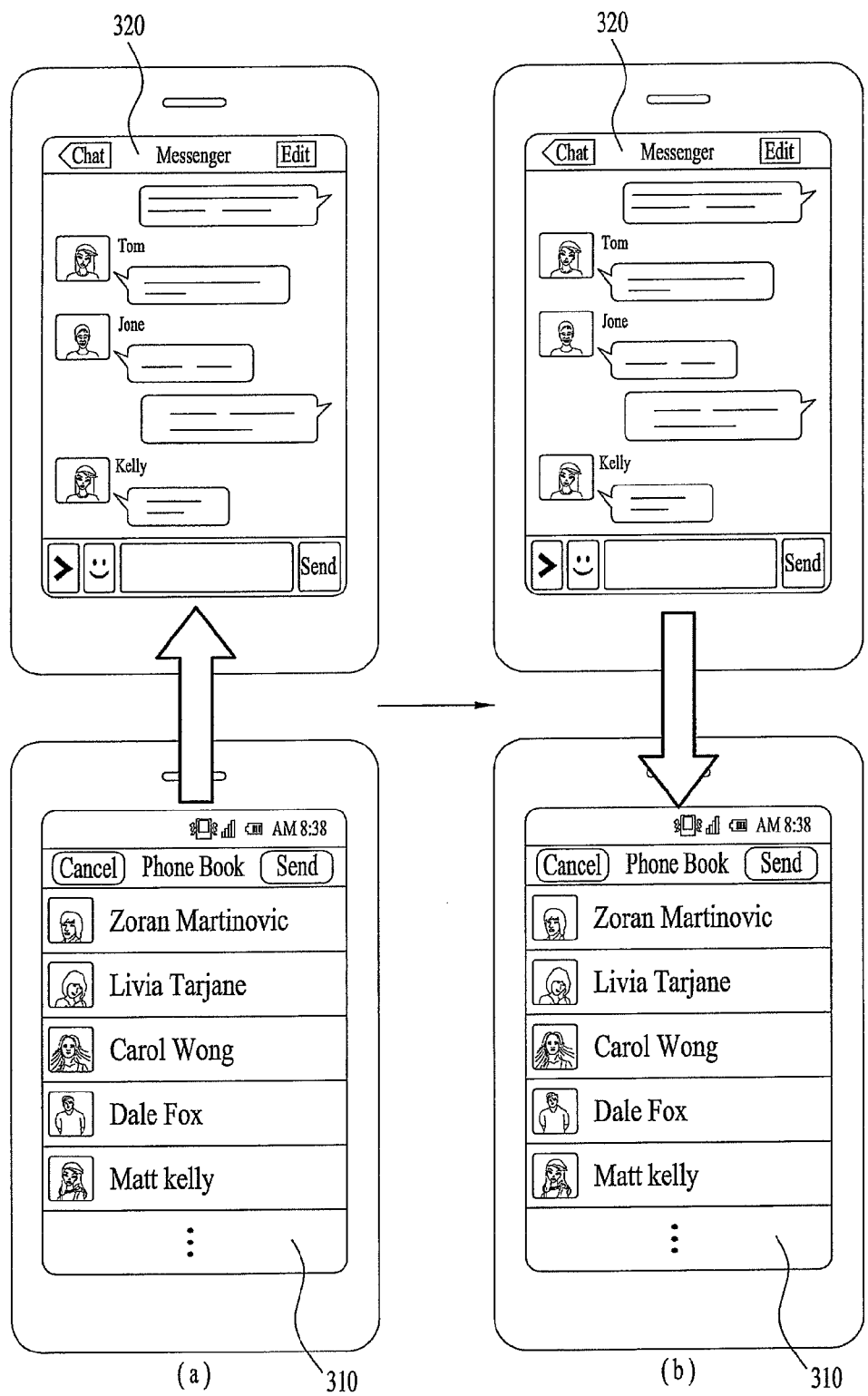

Referring to FIG. 8(*a*), when a 1st function and a 2nd function among currently enabled functions are a phonebook and a chatting messenger, respectively, while an operating screen 310 of the phonebook is displayed, if an input of a motion gesture of moving the mobile terminal 100 in a top direction is detected, the controller 180 searches the memory 160 for a function mapped to a motion property corresponding to the motion gesture moved in the top direction.

If the function found from the memory 160 is the chatting messenger function, the controller 180 displays an operating screen 320 of the chatting messenger by switching the operating screen 310 of the phonebook to the operating screen 320 of the chatting messenger.

Referring to FIG. 8(*b*), while the operating screen 310 of the phonebook is switched to the operating screen 320 of the chatting messenger, if an input of a motion gesture of moving the mobile terminal 100 in a bottom direction is detected, the controller 180 searches the memory 160 for a function mapped to a motion property corresponding to the motion gesture moved in the bottom direction. If the function found from the memory 160 is the phonebook function, the controller 180 displays the operating screen 310 of the phonebook by switching the operating screen 320 of the chatting messenger to the operating screen 310 of the phonebook.

Figure 9:
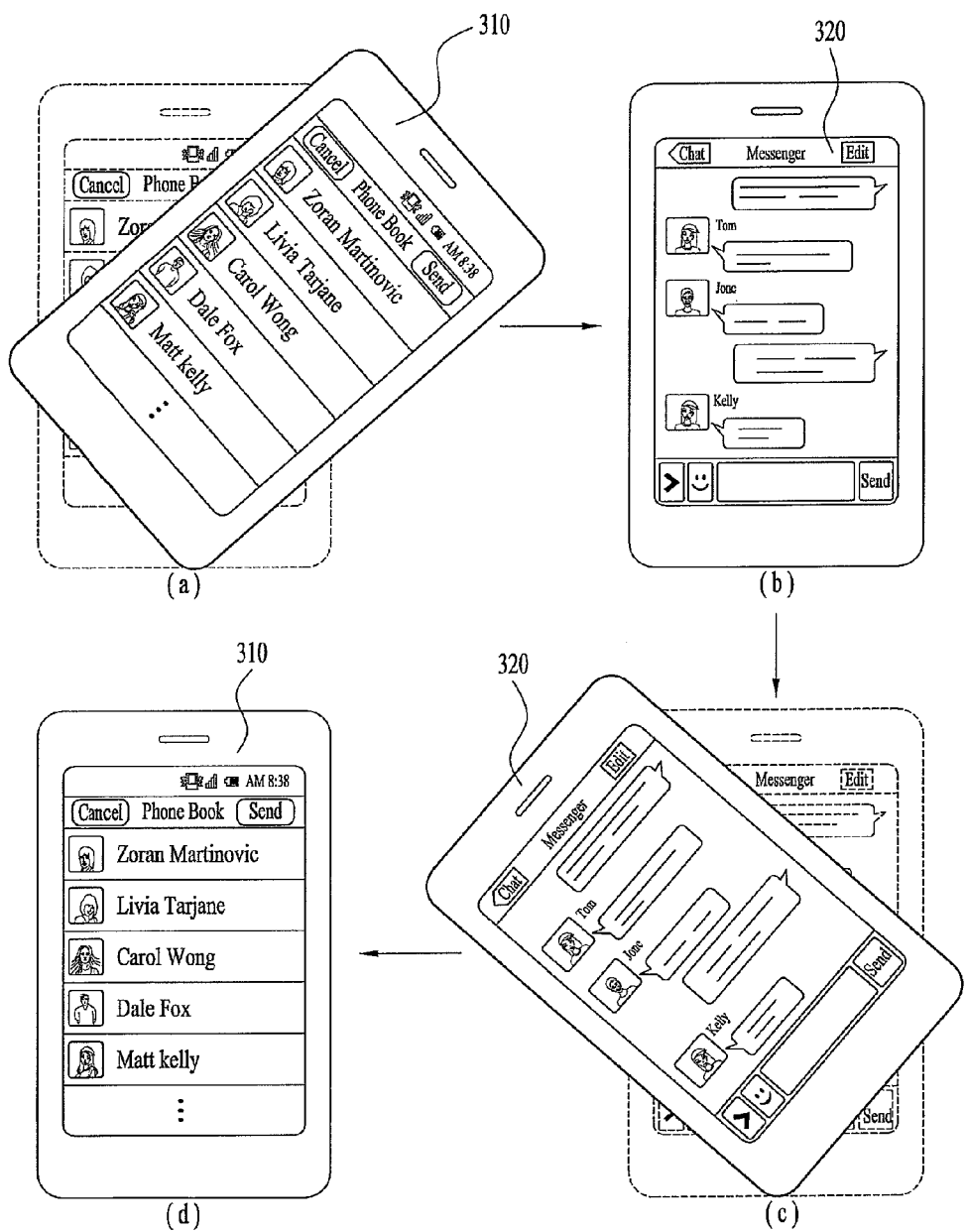

Referring to FIG. 9(*a*), when a 1st function and a 2nd function among currently enabled functions are a phonebook function and a chatting messenger function, respectively, while an operating screen 310 of the phonebook is displayed, if an input of a motion gesture of rotating the mobile terminal 100 over a preset angle in a right direction from a portrait mode to a landscape mode is detected, the controller 180 searches the memory 160 for a function mapped to a motion property corresponding to the motion gesture rotated in the right direction. If the function found from the memory 160 is the chatting messenger function, the controller 180 displays an operating screen 320 of the chatting messenger by switching the operating screen 310 of the phonebook to the operating screen 320 of the chatting messenger.

In particular, if the input of the motion gesture of rotating the mobile terminal 100 over the preset angle clockwise with reference to Z-axis in 3 dimensions is detected, the controller 180 displays the operating screen 320 of the chatting messenger by switching the operating screen 310 of the phonebook to the operating screen 320 of the chatting messenger.

Moreover, while the operating screen 310 of the phonebook is displayed, if an input of a motion gesture of rotating the mobile terminal 100 over the preset angle in the left direction from the portrait mode to the landscape mode is detected, the controller 180 searches the memory 160 for a function mapped to a motion property corresponding to the motion gesture rotated in the left direction. If the function found from the memory 160 is the phonebook and the operating screen 310 of the phonebook is currently displayed on the touchscreen 151, the controller 180 maintains the operating screen 310 of the phonebook as it is, or may display a home screen 330 by switching the operating screen 310 of the phonebook to the home screen 330.

Referring to FIG. 9(*b*), while the operating screen 310 of the phonebook is switched to the operating screen 320 of the chatting messenger, if an input of a motion gesture of rotating the mobile terminal 100 over a preset angle in a left direction from the portrait mode to the landscape mode is detected, the controller 180 searches the memory 160 for a function mapped to a motion property corresponding to the motion gesture rotated in the left direction. If the function found from the memory 160 is the phonebook function, the controller 180 displays the operating screen 310 of the phonebook by switching the operating screen 320 of the chatting messenger to the operating screen 310 of the phonebook.

In particular, if the input of the motion gesture of rotating the mobile terminal 100 over the preset angle counterclockwise with reference to Z-axis in 3 dimensions is detected, the controller 180 displays the operating screen 310 of the phonebook by switching the operating screen 320 of the chatting messenger to the operating screen 310 of the phonebook.

Moreover, while the operating screen 320 of the chatting messenger is displayed, if an input of a motion gesture of rotating the mobile terminal 100 over the preset angle in the right direction from the portrait mode to the landscape mode is detected, the controller 180 searches the memory 160 for a function mapped to a motion property corresponding to the motion gesture rotated in the right direction. If the function found from the memory 160 is the chatting messenger and the operating screen 320 of the chatting messenger is currently displayed on the touchscreen 151, the controller

180 maintains the operating screen 320 of the chatting messenger as it is, or may display the home screen 330 by switching the operating screen 320 of the chatting messenger to the home screen 330.

Figure 10:
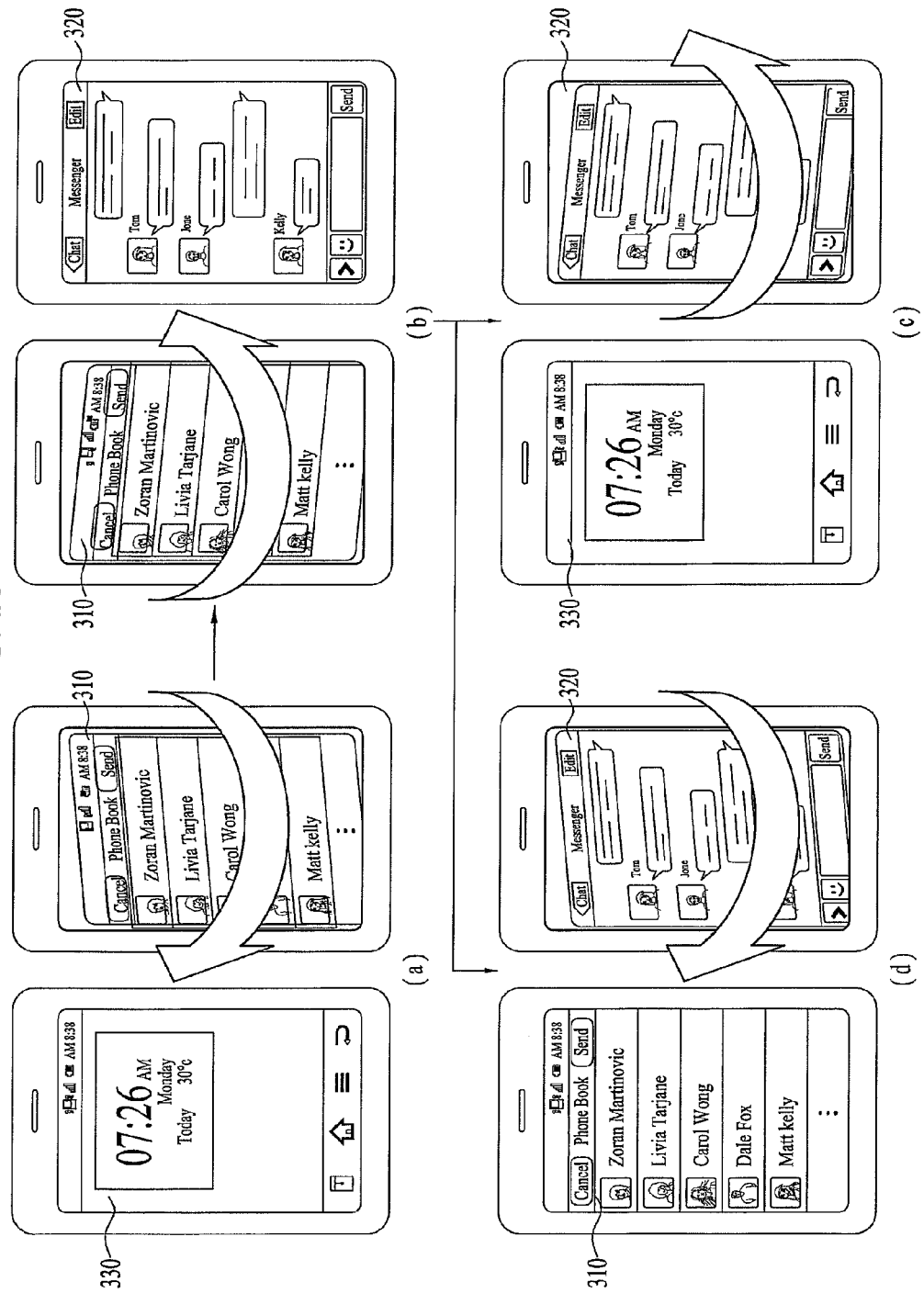

Referring to FIG. 10(*a*), when a 1st function and a 2nd function among currently enabled functions are a phonebook function and a chatting messenger function, respectively, while an operating screen 310 of the phonebook is displayed, if an input of a motion gesture of rotating the mobile terminal 100 over a preset angle in a left direction with reference to X-axis is detected, the controller 180 searches the memory 160 for a function mapped to a motion property corresponding to the motion gesture rotated in the left direction. If the function found from the memory 160 is the phonebook and the operating screen 310 of the phonebook is currently displayed on the touchscreen 151, the controller 180 maintains the current operating screen 310 of the phonebook as it is, or may display a home screen 330 by switching the operating screen 310 of the phonebook to the home screen 330.

Referring to FIG. 10(*b*), while the operating screen 310 of the phonebook is displayed, if an input of a motion gesture of rotating the mobile terminal 100 over a preset angle in a right direction with reference to X-axis is detected, the controller 180 searches the memory 160 for a function mapped to a motion property corresponding to the motion gesture rotated in the right direction. If the function found from the memory 160 is the chatting messenger function, the controller 180 displays an operating screen 320 of the chatting messenger by switching the operating screen 310 of the phonebook to the operating screen 320 of the chatting messenger.

Referring to FIG. 10(*c*), after the operating screen 310 of the phonebook has been switched to the operating screen 320 of the chatting messenger, if an input of a motion gesture of rotating the mobile terminal 100 over a preset angle in the right direction with reference to X-axis is detected, the controller 180 searches the memory 160 for a function mapped to a motion property corresponding to the motion gesture rotated in the right direction.

If the function found from the memory 160 is the chatting messenger and the operating screen 320 of the chatting messenger is currently displayed on the touchscreen 151, the controller 180 maintains the current operating screen 320 of the chatting messenger as it is, or may display the home screen 330 by switching the operating screen 320 of the chatting messenger to the home screen 330.

Referring to FIG. 10(*d*), after the operating screen 310 of the phonebook has been switched to the operating screen 320 of the chatting messenger, if an input of a motion gesture of rotating the mobile terminal 100 over a preset angle in the left direction with reference to X-axis is detected, the controller 180 searches the memory 160 for a function mapped to a motion property corresponding to the motion gesture rotated in the left direction. If the function found from the memory 160 is the phonebook function, the controller 180 displays the operating screen 310 of the phonebook by switching the operating screen 320 of the chatting messenger to the operating screen 310 of the phonebook.

Figure 11:
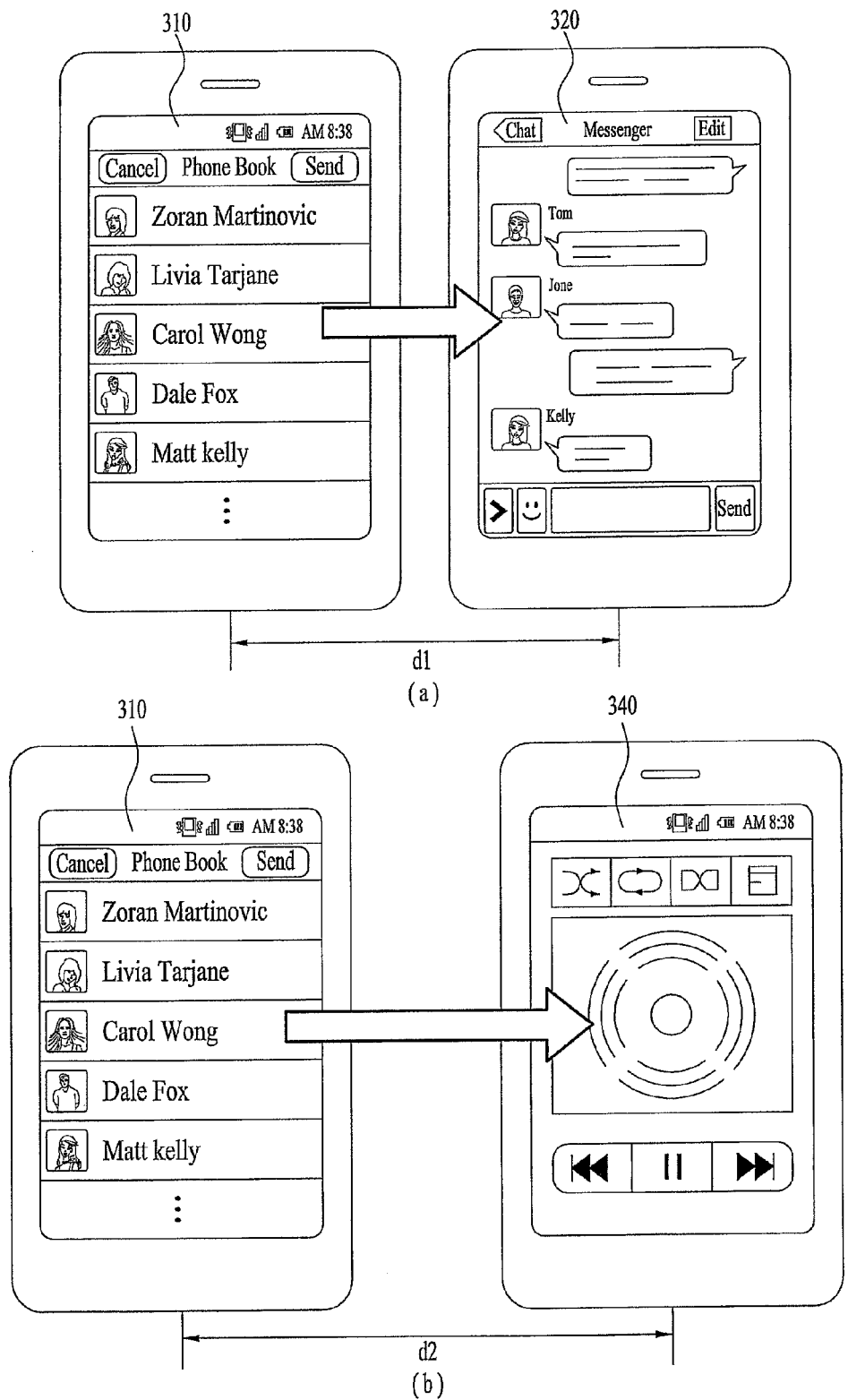

Referring to FIG. 11(*a*), when a 1st function, a 2nd function and a 3rd function among currently enabled functions are a phonebook function, a chatting messenger function and a music player function, respectively, while an operating screen 310 of the phonebook is displayed, if an input of a motion gesture of moving the mobile terminal 100 in a 1st direction by a 1st distance d1 is detected, the controller 180 searches the memory 160 for a function mapped to a motion property corresponding to the motion gesture moved by the distance d1. If the function found from the memory 160 is the chatting messenger function, the controller 180 displays an operating screen 320 of the chatting messenger by switching the operating screen 310 of the phonebook to the operating screen 320 of the chatting messenger.

Referring to FIG. 11(*b*), while the operating screen 310 of the phonebook is displayed, if an input of a motion gesture of moving the mobile terminal 100 in the 1st direction by a 2nd distance d2 (d2>d1) is detected, the controller 180 searches the memory 160 for a function mapped to a motion property corresponding to the motion gesture moved by the distance d2. If the function found from the memory 160 is the music player function, the controller 180 displays an operating screen 340 of the music player by switching the operating screen 310 of the phonebook to the operating screen 340 of the music player.

In particular, in the example shown in FIG. 11, the controller 180 switches the operating screen 310 of the phonebook to the operating screen 320 of the chatting messenger depending on a size of a motion amount of the mobile terminal 100 or can directly switch the operating screen 310 of the phonebook to the operating screen 340 of the music player without passing through the operating screen 320 of the chatting messenger. Moreover, in one embodiment, the size of the motion amount of the mobile terminal 100 may be used to display screens in a chronological order in which the functions were most recently accessed. For example, the different size of the motion may be mapped to functions of most recently accessed functions. Here, in a state in which the first screen is displayed, when the size of the motion is less than a prescribed amount, the second screen for a second function accessed most recently may be displayed, and when the size of the motion is greater than or equal to the prescribed amount, a third screen for a third function accessed before the second function may be displayed.

Referring to FIG. 12(*a*), when a 1st function, a 2nd function and a 3rd function among currently enabled functions are a phonebook function, a chatting messenger function and a music player function, respectively, while an operating screen 310 of the phonebook is displayed, if an input of a motion gesture of moving the mobile terminal 100 in a 1st direction at a 1st speed s1 is detected, the controller 180 searches the memory 160 for a function mapped to a motion property corresponding to the motion gesture moved at the speed s1. If the function found from the memory 160 is the chatting messenger function, the controller 180 displays an operating screen 320 of the chatting messenger by switching the operating screen 310 of the phonebook to the operating screen 320 of the chatting messenger.

Referring to FIG. 12(*b*), while the operating screen 310 of the phonebook is displayed, if an input of a motion gesture of moving the mobile terminal 100 in the 1st direction at a 2nd speed s2 (s2>s1) is detected, the controller 180 searches the memory 160 for a function mapped to a motion property corresponding to the motion gesture moved at the 2nd speed s2. If the function found from the memory 160 is the music player function, the controller 180 displays an operating screen 340 of the music player by switching the operating screen 310 of the phonebook to the operating screen 340 of the music player.

In particular, in the example shown in FIG. 12, the controller 180 switches the operating screen 310 of the phonebook to the operating screen 320 of the chatting messenger depending on a size of a motion speed of the mobile terminal 100 or can directly switch the operating screen 310 of the phonebook to the operating screen 340 of the music player without passing through the operating screen 320 of the chatting messenger.

Figure 13:
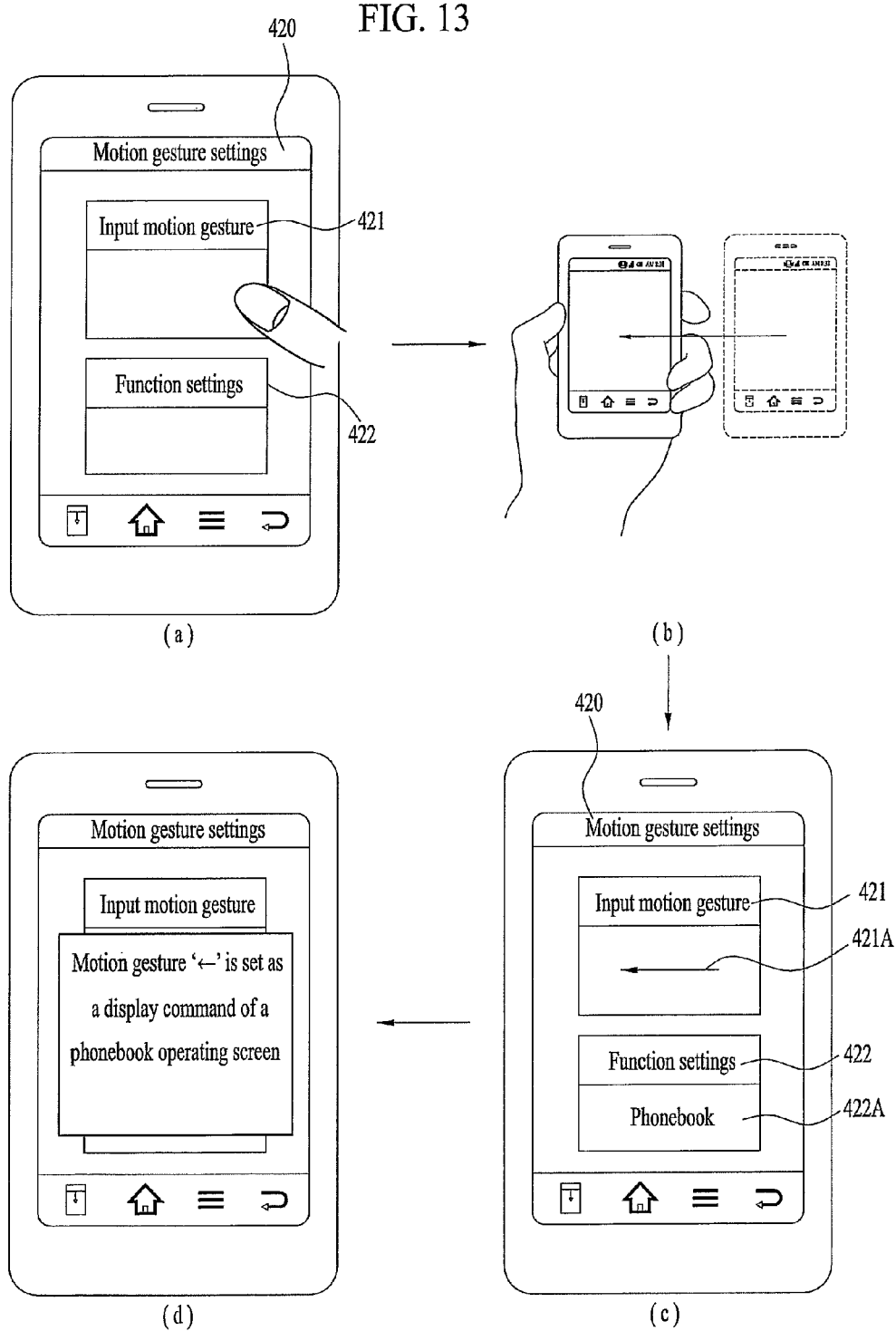

Meanwhile, like the example shown in FIG. 13 in the following, a user is able to set a motion gesture, which is to be used as a command for displaying a desired function, using a motion gesture setting menu.

Referring to FIG. 13(a), if a motion gesture setting menu 420 is selected from menus provided to the mobile terminal 100, the controller displays the motion gesture setting menu 420 on the touchscreen 151.

In this case, the motion gesture setting menu 420 includes a motion gesture input window 421 and a function setting window 422.

If the motion gesture input window 421 is selected, the controller 180 activates the motion sensor 142. If a motion gesture 421A of the mobile terminal is inputted by a user through the motion sensor 142 and a function 422A to be mapped to the motion gesture is set through the function setting window 422 [FIG. 13(b), FIG. 13(c)], the controller 180 saves the motion gesture 421A and the function 422A in the memory 160 by mapping them to each other [FIG. 14(d)].

Figure 14:
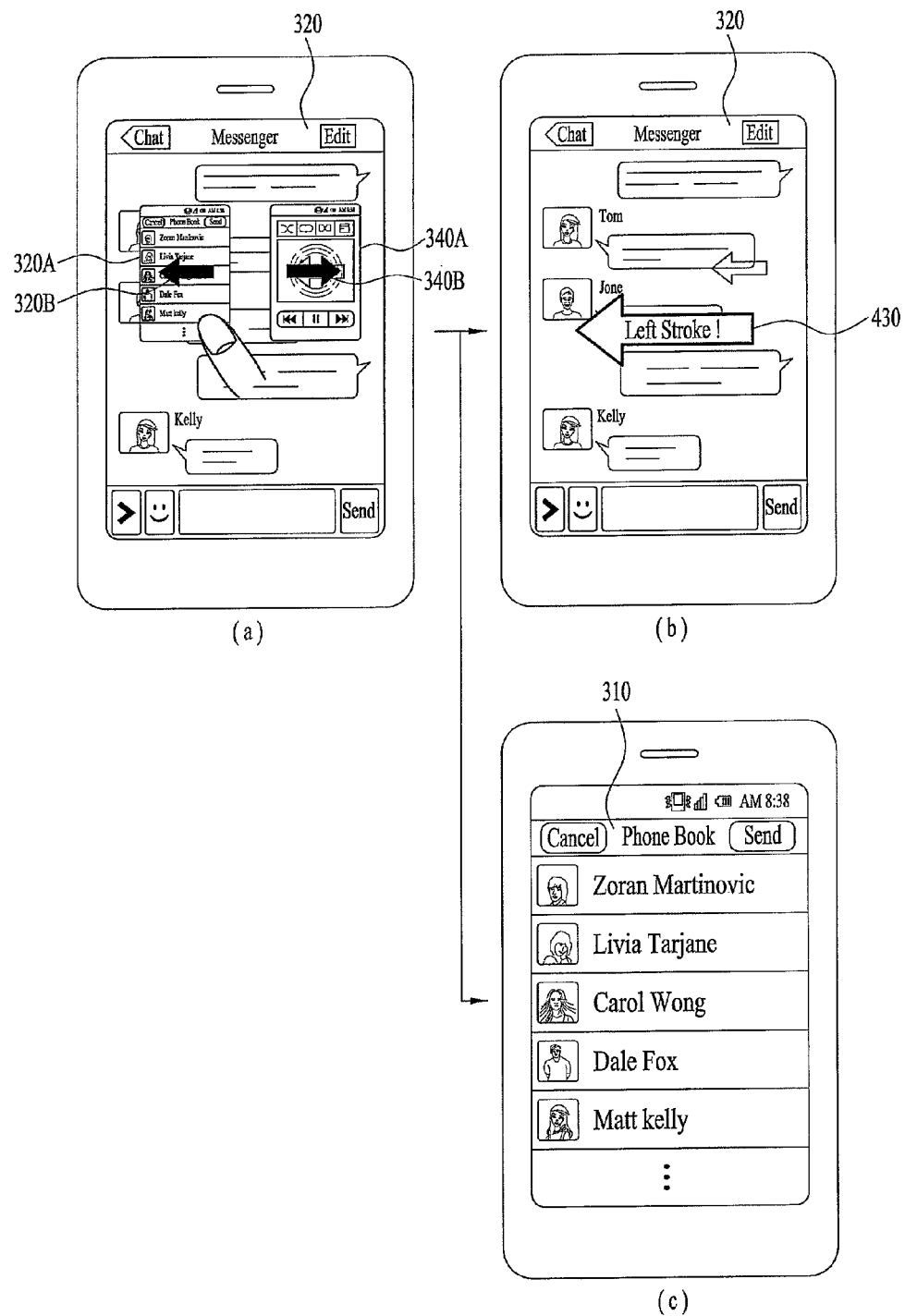

Meanwhile, in the example shown in FIG. 14, the controller 180 displays a 1st function screen among currently enabled functions. The controller 180 displays items, which indicate motion gestures for displaying operating screens of the currently enabled function, respectively, on the 1st function screen. If a specific item is selected from the items, the controller 180 can display an information for guiding an input of the motion gesture corresponding to the selected item.

For instance, referring to FIG. 14(a), while currently enabled functions include a phonebook function, a chatting messenger function and a music player function, if an operating screen 320 of the chatting messenger corresponding to one of the currently enabled functions is displayed, the controller 180 searches the memory 160 for a motion gesture mapped to the phonebook function and a motion gesture mapped to the music player function except the chatting messenger currently displayed on the touchscreen 151.

Subsequently, the controller 180 displays a 1st thumbnail 320A indicating an operating screen 310 of the phonebook and a 2nd thumbnail 340A indicating an operating screen 340 of the music player on the operating screen 320 of the chatting messenger, and also displays 1st and 2nd informations 320B and 340B indicating the found motion gestures within the 1st and 2nd thumbnails 320A and 340A, respectively.

In doing so, if the 1st thumbnail 320A is selected among the 1st thumbnail 320A and the 2nd thumbnail 340A, referring to FIG. 14(b), the controller 180 displays an information 430 for guiding an input of a motion gesture for displaying the operating screen 310 of the phonebook corresponding to the 1st thumbnail 320A.

Moreover, if the 1st thumbnail 320A is selected among the 1st thumbnail 320A and the 2nd thumbnail 340A, referring to FIG. 14(c), the controller 180 switches the currently displayed operating screen 320 of the chatting messenger to the operating screen 310 of the phonebook corresponding to the 1st thumbnail 320A and then displays the operating screen 310 of the phonebook.

Figure 15:
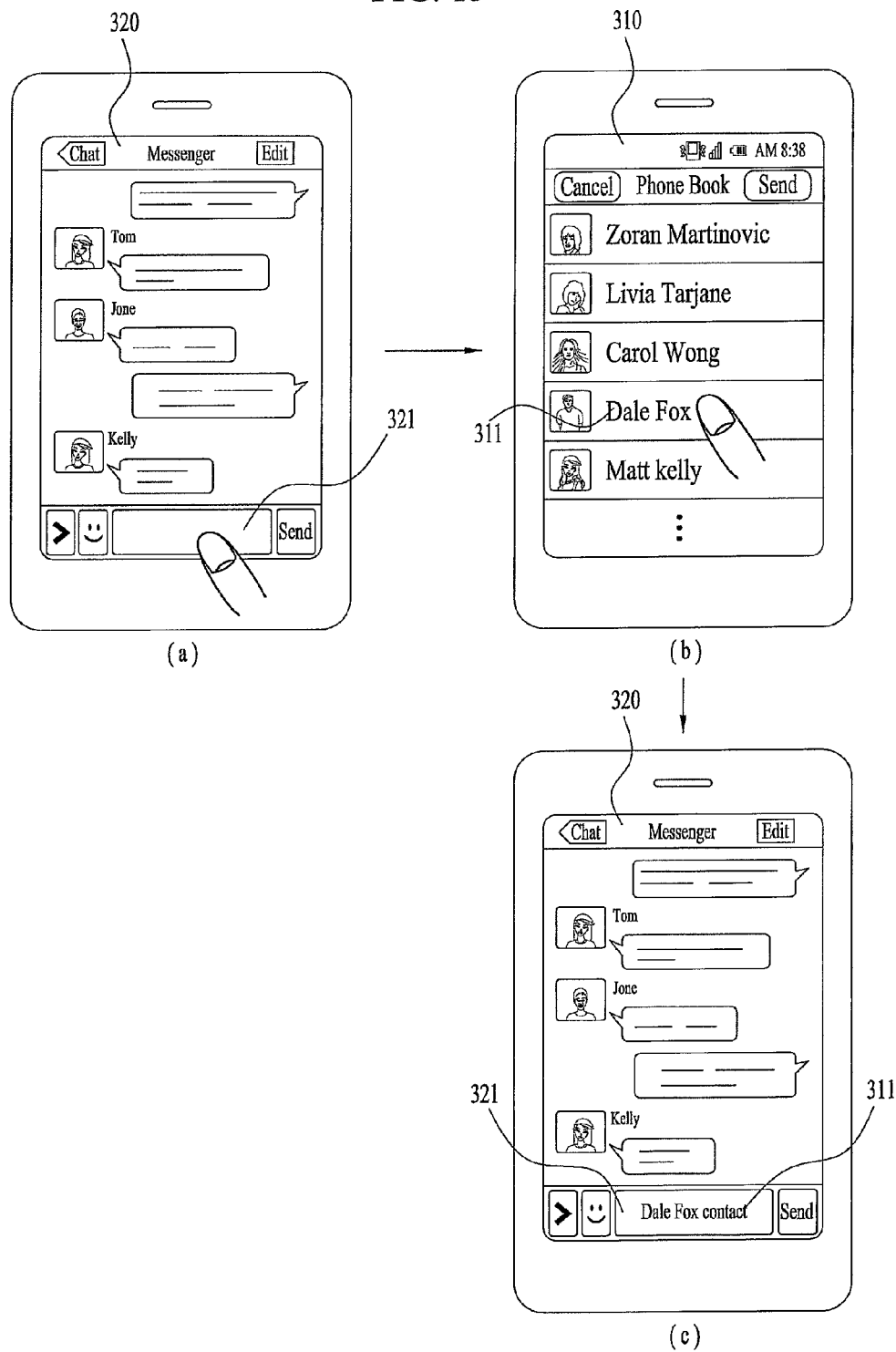

Referring to FIG. 15, after a specific content within an operating screen of a 2nd function among currently enabled functions has been selected, if an input of a motion gesture for switching the operating screen of the 2nd function to an operating screen of a 1st function is detected, the controller 180 switches the operating screen of the 2nd function to the operating screen of the 1st function and is then able to attach, move, copy & paste or the like the specific content to the operating screen of the 1st function.

In this case, the content can include at least one of a file (e.g., an image file, a document file, a video file, a music file, a contact, etc.) included in the operating screen of the 1st function, an image of capturing a specific region designated within the operating screen of the 1st function, and a specific text designated within the operating screen of the 1st function.

For instance, when currently enabled functions include a phonebook function and a chatting messenger function, while an operating screen 320 of the chatting messenger is displayed, if a content attach window 321 within the operating screen 320 of the chatting messenger is selected and a motion gesture for switching the operating screen 320 of the chatting messenger to an operating screen 310 of the phonebook is then inputted [FIG. 15(a)], the controller 180 displays the operating screen 310 of the phonebook by switching the operating screen 320 of the chatting messenger to the operating screen 310 of the phonebook.

If a specific contact 311 is selected as a specific content from the operating screen 310 of the phonebook and a motion gesture for switching the operating screen 310 of the phonebook to the operating screen 320 of the chatting messenger is inputted, referring to FIG. 15(c), the controller 180 displays the operating screen 320 of the chatting messenger by switching the operating screen 310 of the phonebook to the operating screen 320 of the chatting messenger and also attaches the specific contact 311 to the content attach window 320 within the operating screen 320 of the chatting messenger automatically. Here, the selection of the specific content and the motion gesture may be performed consecutively, or alternatively, the motion gesture may be input while the specific content is selected on the display.

Figure 16:
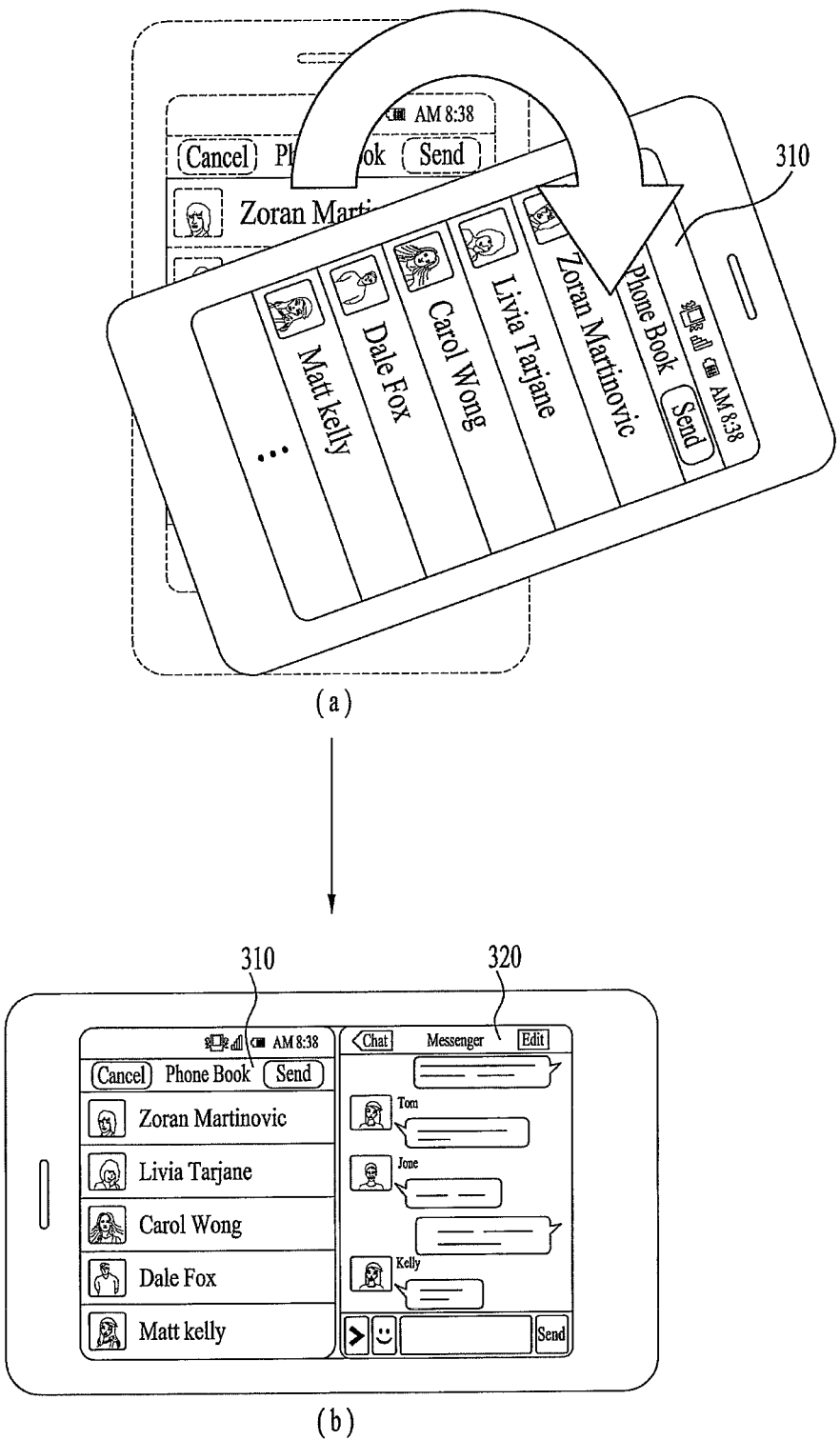

Referring to FIG. 16, while an operating screen of a 1st function among at least two currently enabled functions including the 1st function and a 2nd function is displayed, if a motion gesture for switching the operating screen of the 1st function to an operating screen of the 2nd function is inputted, the controller 180 partitions a whole display region of the touchscreen 151 into at least two regions including a 1st region and a 2nd region and is then able to display the operating screen of the 1st function and the operating screen of the 2nd function on the 1st region and the 2nd region, respectively.

For instance, when currently enabled functions include a phonebook function and a chatting messenger function, while an operating screen 310 of the phonebook is displayed, if a motion gesture for switching the operating screen 310 of the phonebook to an operating screen 320 of the chatting messenger is inputted [FIG. 16(a)], the controller 180 partitions a whole display region of the touchscreen 151 into at least two regions including a 1st region and a 2nd region and is then able to display the operating screen 310 of the phonebook and the operating screen 320 of the chatting messenger on the 1st region and the 2nd region, respectively [FIG. 16(b)].

Figure 17:
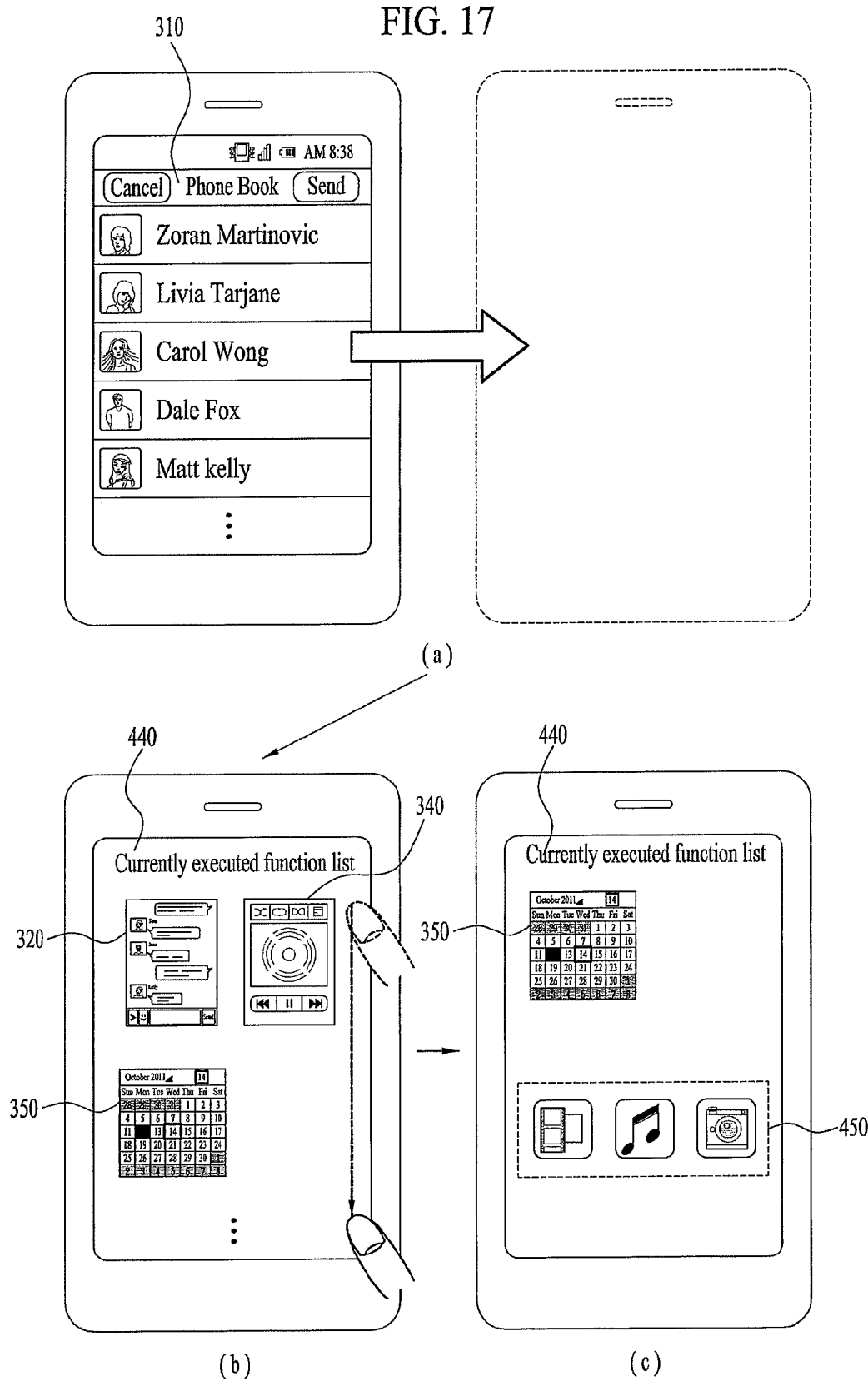

Referring to FIG. 17, while the number of currently enabled functions exceeds a preset number, when an operating screen of a 1st function is displayed, if a motion gesture for switching the operating screen of the 1st function to an operating screen of a 2nd function is inputted, the controller 180 displays a list including the operating screens of the functions and is able to display the operating screen of the function selected from the list by switching the operating screen of the 1st function to the operating screen of the selected function.

For instance, referring to FIG. 17(a), when currently enabled functions include a phonebook function, a chatting messenger function, a music player function and a calendar function, while an operating screen 310 of the phonebook is displayed, if a motion gesture for switching the operating screen 310 of the phonebook to an operating screen 320 of the chatting messenger inputted, the controller 180 determines whether the number of the currently enabled functions exceeds a preset number (e.g., 3, etc.).

If the number of the currently enabled functions does not exceed the preset number, the controller 180 displays the operating screen 320 of the chatting messenger by switching the operating screen 310 of the phonebook to the operating screen 320 of the chatting messenger in response to the inputted motion gesture.

On the contrary, if the number of the currently enabled functions exceeds the preset number, referring to FIG. 17(b), the controller displays a list 440 of operating screens 320, 330 and 340 of the chatting messenger, music player and calendar except the currently displayed operating screen 310 of the phonebook. And, the controller displays the operating screen of the function selected from the list 440 by switching the operating screen 310 of the phonebook to the selected operating screen of the corresponding function.

Referring to FIG. 17(b), if the list 440 is scrolled to a last location by a user's drag touch manipulation, the controller 180 displays at least one 450 of the operating screen of at least one recently used function and the operating screen of at least one preferred function at the last location of the scroll.

Figure 18:
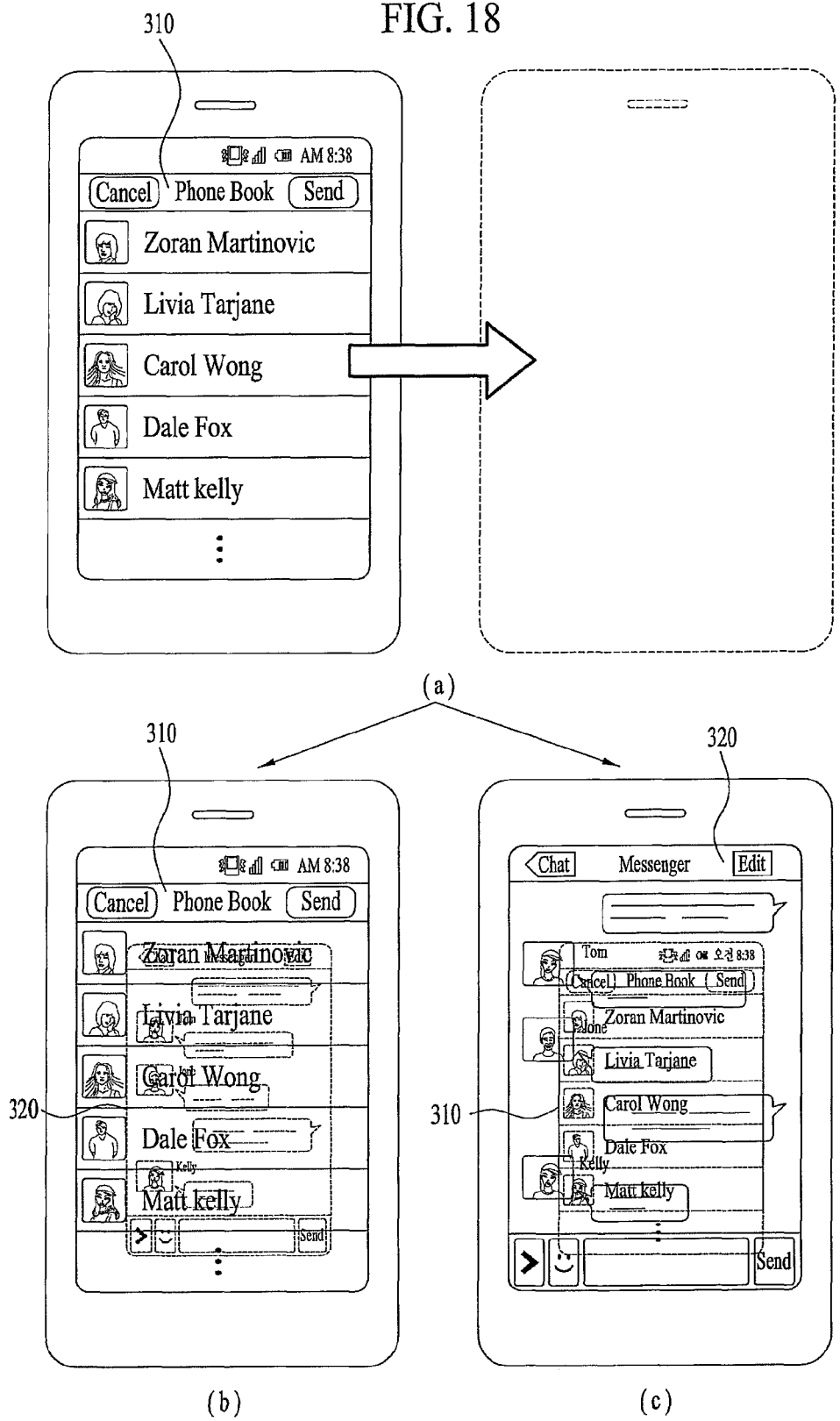

Referring to FIG. 18, while an operating screen of a 1st function among at least two currently enabled functions including the 1st function and a 2nd function is displayed, if a motion gesture for switching the operating screen of the 1st function to an operating screen of the 2nd function is inputted, the controller 180 displays the operating screen of the 2nd function on the operating screen of the 1st function transparently such that both of the operating screens of the 1st and 2nd functions can be viewed together. Alternatively, the controller 180 can display the operating screen of the 1st function on the operating screen of the 2nd function transparently such that both of the operating screens of the 1st and 2nd functions can be viewed together.

For instance, when currently enabled functions include a phonebook function and a chatting messenger function, while an operating screen 310 of the phonebook is displayed, if a motion gesture for switching the operating screen 310 of the phonebook to an operating screen 320 of the chatting messenger is inputted [FIG. 18(a)], the controller 180 displays the operating screen 320 of the chatting messenger on the operating screen 310 of the phonebook in a manner that the operating screen 320 of the chatting messenger is displayed transparently to enable the operating screens 310 and 320 of the phonebook and chatting messenger to be viewed together [FIG. 18(b)].

Moreover, if a motion gesture for switching the operating screen 310 of the phonebook to an operating screen 320 of the chatting messenger is inputted, referring to FIG. 18(c), the controller 180 displays the operating screen 320 of the chatting messenger by switching the operating screen 310 of the phonebook to the operating screen 320 of the chatting messenger and also displays the operating screen 310 of the phonebook on the operating screen 320 of the chatting messenger in a manner that the operating screen 310 of the phonebook is displayed transparently to enable the operating screens 310 and 320 of the phonebook and chatting messenger to be viewed together.

Figure 19:
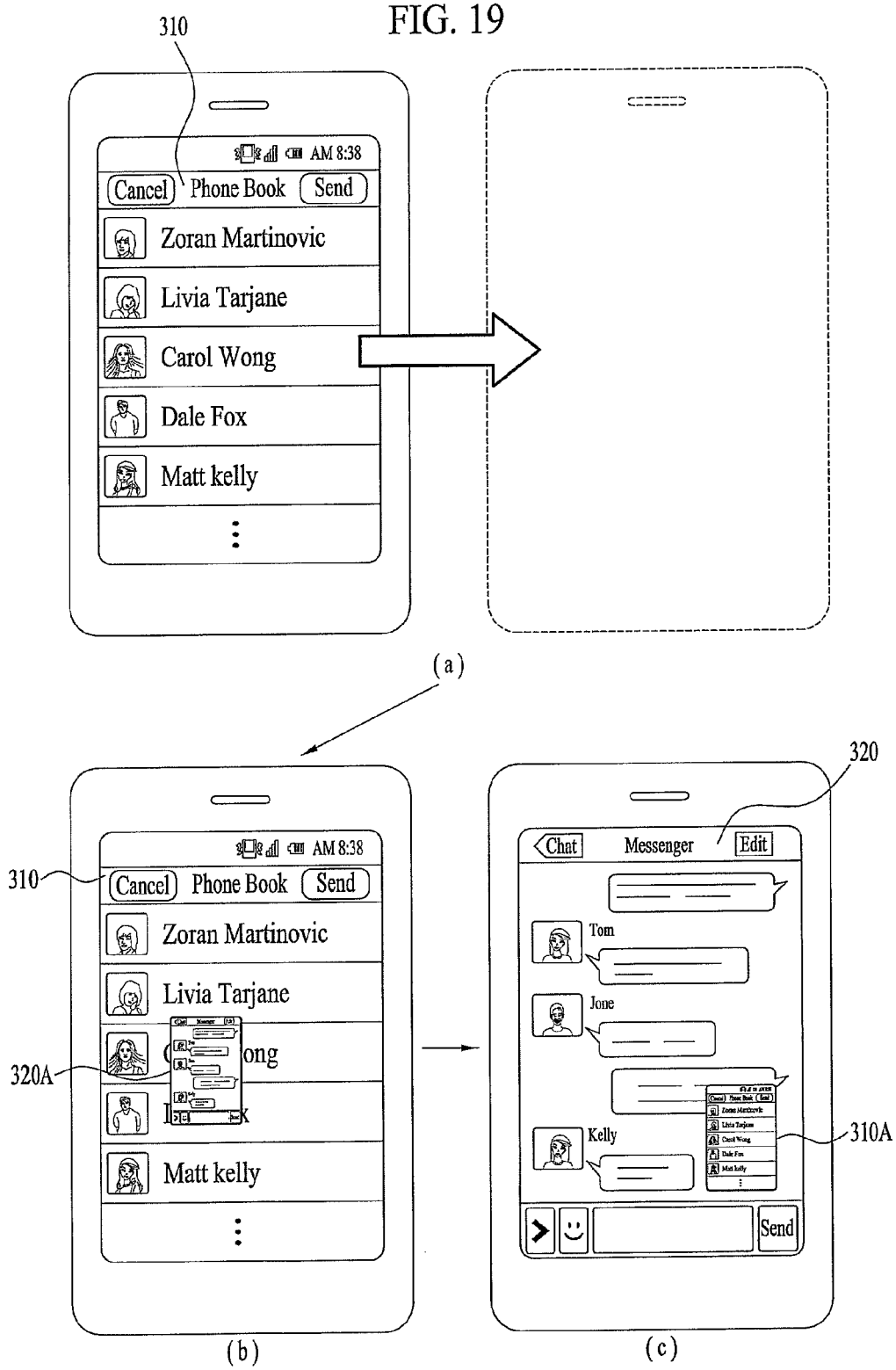

Referring to FIG. 19, while an operating screen of a 1st function among at least two currently enabled functions including the 1st function and a 2nd function is displayed, if a motion gesture for switching the operating screen of the 1st function to an operating screen of the 2nd function is inputted, the controller 180 displays a thumbnail indicating the operating screen of the 2nd function on the operating screen of the 1st function. If the 1st thumbnail is selected, the controller 180 can display the operating screen of the 2nd function by switching the operating screen of the 1st function to the operating screen of the 2nd function.

Moreover, if the operating screen of the 1st function is switched to the operating screen of the 2nd function, the controller 180 displays a 2nd thumbnail indicating the operating screen of the 1st function on the displayed operating screen of the 2nd function. If the 2nd thumbnail is selected, the controller 180 can display the operating screen of the 1st function by switching the operating screen of the 2nd function to the operating screen of the 1st function.

For instance, when currently enabled functions include a phonebook function and a chatting messenger function, while an operating screen 310 of the phonebook is displayed, if a motion gesture for switching the operating screen 310 of the phonebook to an operating screen 320 of the chatting messenger is inputted [FIG. 19(a)], the controller 180 displays a thumbnail 320A indicating the operating screen 320 of the chatting messenger on the operating screen 310 of the phonebook [FIG. 19(b)].

If the thumbnail 320A is selected, referring to FIG. 19(c), the controller 180 displays the operating screen 320 of the chatting messenger corresponding to the selected thumbnail 320A by switching the operating screen 310 of the phonebook to the operating screen 320 of the chatting messenger and also displays a thumbnail 310A indicating the operating screen 310 of the phonebook on the displayed operating screen 320 of the chatting messenger.

If the thumbnail 310A is selected, the controller 180 can display the operating screen 310 of the phonebook by switching the operating screen 320 of the chatting messenger to the operating screen 310 of the phonebook corresponding to the selected thumbnail 310A.

Figure 20:
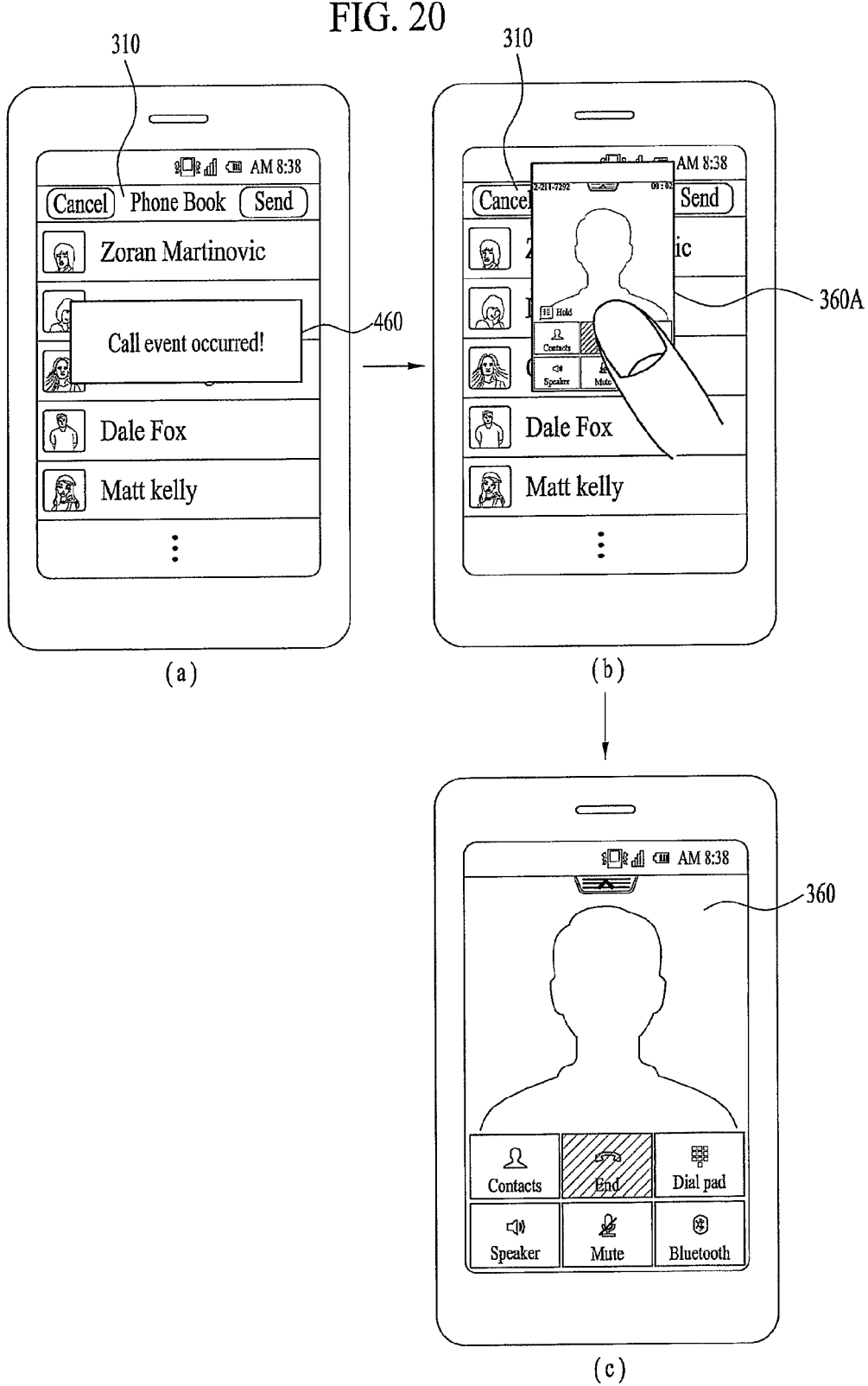

Referring to FIG. 20, while an operating screen of a 1st function or a 2nd function among at least two currently enabled functions including the 1st function and a 2nd function is displayed, if a specific event occurs, the controller 180 displays a thumbnail indicating an operating screen of the occurring event on the operating screen of the 1st or 2nd function. If the thumbnail is selected, the controller 180 can display the operating screen of the event by switching the operating screen of the 1st or 2nd function to the operating screen of the event.

In this case, the event may include at least one of a call reception, a message reception, an alarm output and the like. For example, FIG. 20 shows that the event includes a call reception event. Moreover, the message may include at least one of an SMS (short message service) message, an MMS (multimedia message service) message, an SNS (social network service) message, a specific chatting messenger message and the like.

For instance, when currently enabled functions include a phonebook function and a chatting messenger function, while an operating screen 310 of the phonebook is displayed, if a call event 460 according to the call reception occurs [FIG. 20(a)], the controller 180 displays a thumbnail 360A indicating an operating screen 360 of the occurring call event [FIG. 20(b)].

If the thumbnail 360A is selected, referring to FIG. 20(c), the controller 180 displays the operating screen 360 of the call event corresponding to the selected thumbnail 360A by switching the operating screen 310 of the phonebook to the operating screen 360 of the call event.

Figure 21:
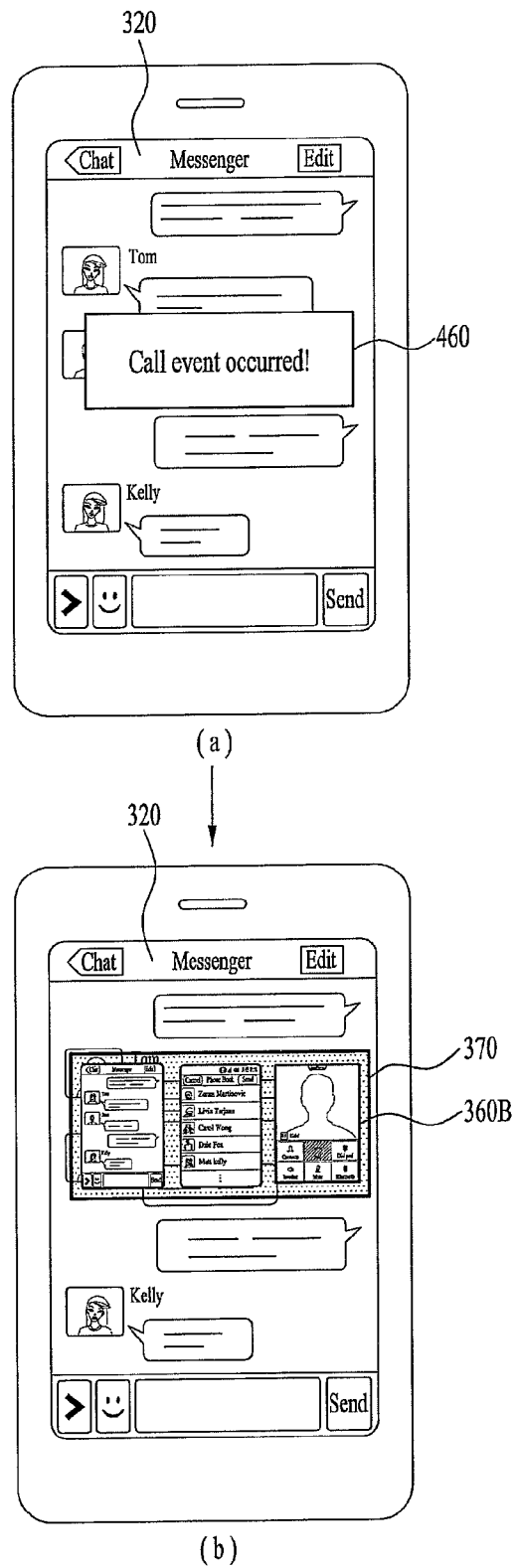

Referring to FIG. 21, while an operating screen of a 1st function or a 2nd function among at least two currently enabled functions including the 1st function and a 2nd function is displayed, if a specific event occurs, the controller 180 can display an information indicating a screen location of an operating screen of the occurring event on the 1st or 2nd function screen.

In this case, the event may include at least one of a call reception, a message reception, an alarm output and the like. For example, FIG. 21 shows that the event includes a call reception event. Moreover, the message may include at least one of an SMS (short message service) message, an MMS (multimedia message service) message, an SNS (social network service) message, a specific chatting messenger message and the like.

For instance, when currently enabled functions include a phonebook function and a chatting messenger function, while an operating screen 310 of the phonebook is displayed, if a call event 460 according to the call reception occurs [FIG. 21(a)], the controller 180 displays an information 370 indicating a screen location of an operating screen 360 of the call event on the operating screen 310 of the phonebook [FIG. 21(b)]. If the thumbnail 360B is selected from the information 370, the controller 180 displays the operating screen 360 of the call event by switching the operating screen 310 of the phonebook to the operating screen 360 of the call event.

Figure 22:
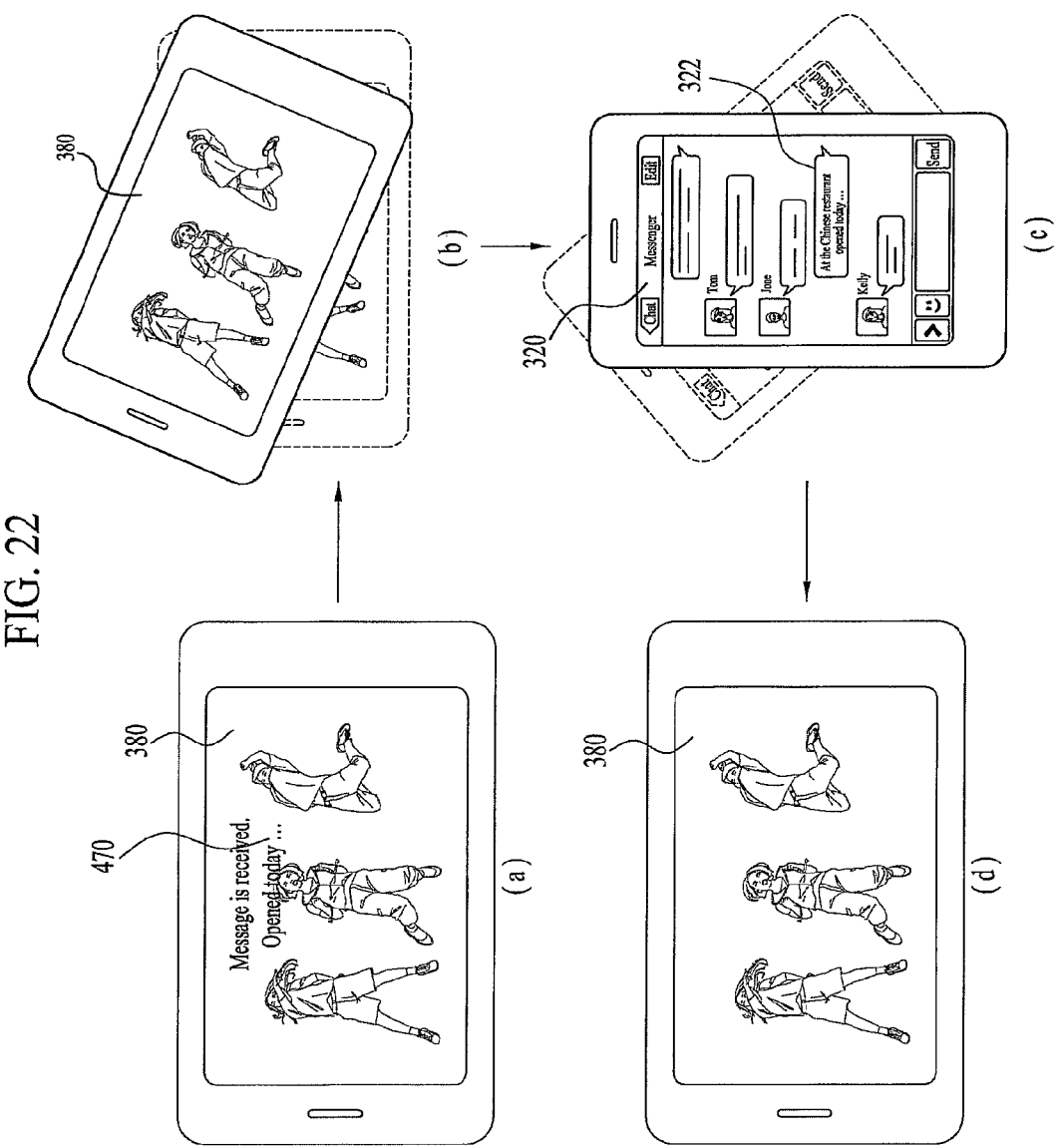

Referring to FIG. 22, while at least two functions including a 1st function and a 2nd function are enabled, when an operating screen of the 1st function is displayed and an event associated with the 2nd function occurs, if an input of a motion gesture of the mobile terminal 100 is detected, the controller 180 displays an operating screen of the 2nd function by switching the operating screen of the 1st function to the operating screen of the 2nd function in a manner that an information of the occurring event is included in the operating screen of the 2nd function.

In this case, the event may include at least one of a call reception, a message reception, an alarm output and the like. For example, FIG. 22 shows that the event includes a message reception event. Moreover, the message may include at least one of an SMS (short message service) message, an MMS (multimedia message service) message, an SNS (social network service) message, a specific chatting messenger message and the like.

In the example shown in FIG. 22, among the currently enabled at least two functions, the 1st function is a video play function and the 2nd function is a chatting messenger function or a message menu function. In this case, messages displayed within operating screens of the chatting messenger and the message menu can be displayed in order of transceived time in a manner that message contents are represented as word balloons.

In particular, while the video play function and the chatting messenger function (or message menu function) are currently enabled and a play screen 380 of the video is displayed on the touchscreen 151, if a message reception event of receiving a message from at least one counterpart terminal occurs, the controller 180 detects whether a motion gesture of the mobile terminal 100 is inputted through the motion sensor 142.

For instance, the motion gesture detected on playing the video may include a motion of changing a display mode of the mobile terminal 100 to a portrait mode from a landscape mode.

Moreover, the received message may include a chatting message received through the chatting messenger or a message in a format corresponding to a default message menu function provided to the mobile terminal 100.

If the message is received, the controller 180 can control a message reception notification information 470, which includes a notification of a reception of the message and at least one portion of a content of the message, to be displayed within the play screen 380 of the video.

When the message reception event 470 occurs in the course of playing the video, if an input of a motion gesture of changing the display mode of the mobile terminal 100 to the portrait mode from the landscape mode is detected [FIG. 22(b)], the controller 180 displays the operating screen 320 of the chatting messenger by switching the video play screen 380 to the operating screen 320 of the chatting messenger in a manner that the content 322 of the received message is included in a chatting content display window within the operating screen 320 of the chatting messenger [FIG. 22(c)].

In doing so, if the video play screen 380 is switched to the operating screen 320 of the chatting messenger, the controller 180 can pause the played video while the operating screen 320 of the chatting messenger is displayed on the touchscreen 151.

Subsequently, while the operating screen 320 of the chatting messenger is displayed on the touchscreen 151 in the portrait mode, if a motion gesture of re-changing the current display mode of the mobile terminal 100 to the landscape mode from the portrait mode is detected through the motion sensor 142, referring to FIG. 23(d), the controller 180 displays the video play screen 380 by switching the operating screen 320 of the chatting messenger to the video play screen 380 and resumes the paused video play.

Accordingly, embodiments of the present disclosure provide various effects and/or features.

First of all, the present disclosure can quickly switch a current function screen to a desired function screen using a motion gesture of a mobile terminal without multiple touch or key inputs.

It will be appreciated by those skilled in the art that the present disclosure can be specified into other form(s) without departing from the spirit or scope of the disclosures.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). Further, the processor may include the controller 180 of the terminal.

It will be appreciated by those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a display unit configured to display a first screen of a first function among screens for a plurality of currently executed functions;
   a motion sensor configured to detect a motion gesture corresponding to a movement of the mobile terminal; and
   a controller configured to:
      switch the first screen to a second screen of a second function among the screens of the plurality of currently executed functions in response to detection of a first motion gesture for switching the first screen to the second screen, and
   wherein:
      the first screen includes a prescribed region for attaching a specific content included in the second screen, and
      the controller is further configured to:
      when the first motion gesture is detected via the motion sensor after the prescribed region is selected, switch the first screen to the second screen;
      when a second motion gesture for switching the second screen to the first screen is detected via the motion sensor after the specific content is selected from the switched second screen, switch the second screen to the first screen; and
      automatically attach the selected specific content to the prescribed region in the switched first screen.

2. The mobile terminal of claim 1, wherein one of the first motion gesture and the second motion gesture is a gesture input having prescribed characteristics including at least one of a direction of motion, a direction of rotation, an amount of movement, an amount of rotation, a speed of motion or a pattern of motion.

3. The mobile terminal of claim 1, further comprising:
   a memory configured to store a plurality of prescribed motion gestures for displaying each of the screens of the plurality of currently executed functions,
   wherein the controller searches the memory for the second function corresponding to the detected first motion gesture, and displays the second screen of the searched second function by switching the first screen to the second screen.

4. The mobile terminal of claim 3, wherein, when the searched second function is not currently executed, the controller maintains the display of the first screen or switches the first screen to a home screen.

5. The mobile terminal of claim 1, wherein, when a prescribed motion gesture is detected via the motion sensor, the controller partitions a display region of the display unit into a plurality of regions including a first region and a second region, and displays the first screen in the first region and displays the second screen in second region.

6. The mobile terminal of claim 1, wherein, when a prescribed motion gesture is detected via the motion sensor, the controller controls to display a list of the screens for the plurality of currently executed functions and to display a screen for a prescribed function selected from the list by switching the first screen to the screen for the selected function.

7. The mobile terminal of claim 6, wherein the displayed list includes at least one of a screen for at least one function that has been recently used or a screen for at least one function that is preferred by a user.

8. The mobile terminal of claim 1, wherein, when a prescribed motion gesture is detected via the motion sensor, the controller controls the second screen to be displayed on the first screen, the second screen being displayed to be transparent such that the first and second screens are visible at the same time.

9. The mobile terminal of claim 8, wherein, when the transparently displayed screen of the second function is selected, the controller switches the first screen to the second screen and controls the first screen to be transparently displayed on the second screen.

10. The mobile terminal of claim 1,
    wherein, when a prescribed motion gesture is detected via the motion sensor, the controller displays a thumbnail of the second screen on the first screen, and
    wherein, when the thumbnail is selected, the controller switches the first screen to the second screen.

11. The mobile terminal of claim 1,
    wherein, when the first screen is switched to the second screen, the controller controls to display a thumbnail of the first screen on the second screen, and
    wherein, when the thumbnail is selected, the controller switches the first screen to the second screen.

12. The mobile terminal of claim 1, wherein, when there is no function screen associated with the detected first motion gesture, the controller switches the first screen to a home screen.

13. The mobile terminal of claim 1, wherein the controller switches the first screen to one of the second screen or a third screen for a third function according to an amount of movement in the detected first motion gesture.

14. The mobile terminal of claim 1,
    wherein, when an event occurs while the first screen or the second screen is displayed, the controller controls to display a thumbnail of a screen associated with the event on the first screen or the second screen, and
    wherein, when the thumbnail is selected, the controller switches the first screen or the second screen to the screen associated with the event.

15. The mobile terminal of claim 14, wherein, when the event occurs while the first screen or the second screen is displayed, the controller controls to display information indicating a location of the screen associated with the event on the displayed first or second screen.

16. A method of controlling a mobile terminal, the method comprising:
   executing a plurality of functions on the mobile terminal;
   displaying a first screen of a first function among screens for a plurality of executed functions;
   detecting a first motion gesture corresponding to a movement of the mobile terminal;
   switching the first screen to a second screen of a second function among the screens of the plurality of executed functions in response to a first motion gesture for switching the first screen to the second screen, wherein the first screen includes a prescribed region for attaching a specific content included in the second screen,
   when the first motion gesture is detected after the prescribed region is selected, switching the first screen to the second screen;
   when a second motion gesture for switching the second screen to the first screen is detected after the specific content is selected from the switched second screen, switching the second screen to the first screen; and
   automatically attaching the selected specific content to the prescribed region in the switched first screen.

* * * * *